(12) United States Patent
Loukus et al.

(10) Patent No.: US 8,075,827 B2
(45) Date of Patent: Dec. 13, 2011

(54) VARIABLE-DENSITY PREFORMS

(75) Inventors: Josh E. Loukus, Calumet, MI (US); Bob G. Coleman, Augusta, GA (US); Charles Benjamin Rau, III, Gig Harbor, WA (US); Dallas W. Jolley, Jr., University Place, WA (US)

(73) Assignee: FTF, LLC, Calumet, MI (US)

( * ) Notice: Subject to any disclaimer, the term of this patent is extended or adjusted under 35 U.S.C. 154(b) by 511 days.

(21) Appl. No.: 11/949,720

(22) Filed: Dec. 3, 2007

(65) Prior Publication Data

US 2010/0001231 A1    Jan. 7, 2010

Related U.S. Application Data

(60) Provisional application No. 60/868,301, filed on Dec. 1, 2006.

(51) Int. Cl.
| | |
|---|---|
| *B29B 7/00* | (2006.01) |
| *B29C 45/00* | (2006.01) |
| *B29C 45/14* | (2006.01) |
| *B28B 19/00* | (2006.01) |
| *B22C 9/08* | (2006.01) |

(52) U.S. Cl. ............... 264/328.1; 264/328.14; 264/273; 264/269; 249/105

(58) Field of Classification Search ............ 264/23, 264/28, 621, 628, 640, 40.1, 138, 310; 419/2; 164/69.1

See application file for complete search history.

(56) References Cited

U.S. PATENT DOCUMENTS

| | | | | |
|---|---|---|---|---|
| 3,233,012 | A | * | 2/1966 | Bodine, Jr. ............ 264/444 |
| 4,233,045 | A | | 11/1980 | Sarkar |
| 4,995,444 | A | | 2/1991 | Jolly |
| 5,256,875 | A | | 10/1993 | Hoekman |
| 5,908,587 | A | * | 6/1999 | Gross et al. ............ 264/28 |
| 5,980,792 | A | | 11/1999 | Chamlee |
| 6,375,877 | B2 | | 4/2002 | Lauf |

FOREIGN PATENT DOCUMENTS

| | | | |
|---|---|---|---|
| WO | 2007/033378 | | 3/2007 |
| WO | WO2007033378 | * | 3/2007 |

* cited by examiner

*Primary Examiner* — Ling Choi
*Assistant Examiner* — Monique Peets
(74) *Attorney, Agent, or Firm* — Davis Wright Tremaine LLP; Barry L. Davison

(57) ABSTRACT

Provided are novel devices and methods for making a variable density preform, the methods comprising obtaining a slurry comprising a reinforcement particle component and a liquid component; obtaining a die cavity having at least one inlet opening and at least one exit opening defining at least one die cavity flow path therebetween directed toward the exit opening, the at least one exit opening suitably sized or configured to provide for exit of the at least one liquid component while impeding or blocking exit of the at least one reinforcement particle component; and introducing the slurry under pressure, and for a sufficient time period, through the inlet orifice into the die cavity flow path to provide for a decreasing pressure gradient along the flow path direction, to provide for a variable density of the at least one particle component, the particle density increasing in the at least one flow path direction.

25 Claims, 18 Drawing Sheets

Detail A

SECTION B-B

VARIABLE-DENSITY PREFORMS

CROSS-REFERENCE TO RELATED APPLICATIONS

This application claims the benefit of priority to U.S. Provisional Patent Application Ser. No. 60/868,301, filed 1 Dec. 2006 and entitled "Variable Density Preforms," which is incorporated by reference herein in its entirety.

FIELD OF THE INVENTION

Certain aspects relate generally to reinforced composites and reinforced castings, and more particularly to novel 'preforms' comprising a gradient or variable density of reinforcement particles (e.g., ceramic particles), to novel lightweight preform-reinforced composites and castings (e.g., brake drums, disk brake rotors, cylinder liners, clutch parts, etc) comprising matrix material infiltrated performs, and to methods for making same.

BACKGROUND

Traditional materials (e.g., metals, plastics, ceramics, resins, concrete, etc.) do not always provide components with all the requisite properties sufficient for adequate performance under field service conditions. Moreover, despite decades of intensive research to provide improved methods and materials, substantial demand still exists in many commercial and industrial applications for improved technology and low-cost methods to improve final component performance (e.g., enhanced strength, enhanced mechanical behavior characteristics, weight reduction, improved wear resistance, enhanced surface activity/reactivity and/or properties, enhanced thermal conductivity, low and/or balanced and/or controlled coefficients of thermal expansion (CTE), reduced residual stress during the forming process and during thermal cycling of reinforced components in service, enhanced recycle potential, reduced fuel consumption, reduced pollutant emissions and green house gases, etc).

Reinforcement of traditional materials. Matrix composites generally refer to traditional materials (material systems) comprising one or more discrete reinforcement constituents (the reinforcement material(s)) distributed within a continuous phase (the matrix material). The distinguishing characteristics of such matrix composites derive from the properties of the reinforcement constituent(s), from the architectural shape and geometry of such constituent(s), and from the properties of the interfaces between and among different constituents and the matrix. In particular applications, prior art forming and manufacturing processes are designed to provide a uniform distribution of the reinforcement constituent in the matrix. In alternate applications, the distribution of the reinforcement constituent is non-uniform. For example, centrifugal casting applications provide for gradient or layered distributions of reinforcement constituent(s), but are impractical as discussed below and are subject to Coriolis effects that preclude uniform concentric particle density at any given radial position. Additionally, applications comprising infiltration casting of matrix materials into porous reinforcement 'preforms', while not providing for continuous gradients, nonetheless provide for positioning of reinforcement constituent(s) within a defined portion of a larger casting (i.e., placement of the preform at a defined position within a casting). In both uniform and non-uniform applications, it is important that there is an adequate bond formed between the matrix material and the discrete reinforcing constituent(s), without substantial degradation of the mechanical properties of the reinforcing constituent(s). Particle reinforcement is a preferred reinforcement constituent/material, and typically comprises non-metallic and commonly ceramic particles (e.g., SiC, $Al_2O_3$, etc.), but may comprise a variety of particles and materials that provide advantages or reinforcement for one or more properties of the matrix composite. Reinforcement of matrix material with fibers, continuous-fibers, monofilament, and/or short-fibers is also known in the art. Generally, different types of matrix composites require or are preferably associated with different primary processing routes/methods (e.g., in-situ reactive processes, diffusion bonding, blending and consolidation, vapor deposition and consolidation, liquid-state processing, stir casting/slurry casting, centrifugal casting, and infiltration processes involving infiltration of matrix material into porous 'preforms').

Deficiencies of the art. Post-manufacture machining of matrix composite materials comprising durable reinforcement can be time-consuming and expensive, and near net-shape forming, and selective reinforcement techniques have therefore been used to help reduce manufacturing costs. For example, in situ selective reinforcement methods involving placement and positioning of a pre-cast reinforcement material member into a near net-shape casting mold, followed by casting of matrix material around the reinforcement member is known in the art. However, while the amount and/or density of pre-cast reinforcement material can be varied as desired, the reinforcement constituent material of the reinforcement members is not integrated (not mixed or infiltrated) with the matrix material, except perhaps in a limited extent at the interfacial boundaries between the reinforcement member and the unreinforced matrix material. Therefore, such in situ methods are hindered by abrupt and problematic differential coefficients of thermal expansion (CTE) between the matrix and reinforcement member. Such abrupt transitions in CTE at the matrix:reinforcement interface boundaries not only give rise to residual stress during the forming process (e.g., residual stress-concentration), but also manifest in stress fractures during thermal cycling of the reinforced components in service.

Likewise, in another example, there are substantial deficiencies in in situ selective reinforcement methods involving infiltration casting of matrix material into porous 'preforms' (comprising reinforcement constituent(s)) positioned in near net-shape casting molds. While such prior art 'preform' methods are fast, and result in a more integrated, infiltrated reinforcement 'preform' with substantially more contact area between the reinforcement and matrix materials, they are still substantially hindered/limited by abrupt transitions in CTE at the interface/boundaries between the 'preform' and the unreinforced matrix material that results in stress problems as described above. Additionally, there are practical limits to the amount/density of reinforcement material in the porous 'preforms,' because resistance to infiltration casting substantially increases at high reinforcement levels (e.g. beyond 15% to 20% material in the 'preform'). Furthermore, while 'preforms' are typically positioned in casting molds that are preheated to facilitate infiltration, such preheating, for practical reasons, is at a temperature significantly less than the melting temperature of the molten matrix material (e.g., aluminum). Therefore, there are practical limits to the thickness/cross-sectional area of such prior art performs, because the matrix material must completely infiltrate the 'preform' prior to significant cooling of the molten matrix material. Because of this, prior art 'preforms' are typically not thicker than about 0.400 inches, placing a practical limitation on the extent of reinforcement that can be integrated into the finished casting.

In yet another example, there are substantial deficiencies in selective reinforcement methods involving centrifugal casting (in near net-shape casting molds) of composite material to favorably place or distribute reinforcement particles within a matrix material of differing density (see, e.g., U.S. Pat. No. 5,980,792 to Chamlee). While abrupt transitions in CTE at the matrix:reinforcement interface boundaries can be reduced in those centrifugal embodiments where continuous particle gradients are formed within the matrix material, such methods still suffer from differential CTE effects in cost-effective embodiments comprising layered reinforcement particles. Moreover, all centrifugal casting embodiments (including that of U.S. Pat. No. 5,980,792) are relatively slow (particularly when used with moderate to high reinforcement particle densities) compared to other casting methods (e.g., high pressure die casting, squeeze casting, etc.), and are thus impractical and too expensive for most commercial applications. Additionally, in centrifugal methods, the attainable variations of particle distributions are limited to bands or layers and/or continuous gradients, and if different reinforcement particle types having differing densities are simultaneously used, it may be impossible to get adequate coordinate (co-localized) particle gradient distributions for the divergent particle types, or to get the different particle types where they are needed, and in the desired pattern.

In further examples, there are substantial deficiencies in selective reinforcement methods involving deposition or spraying (e.g., by low or high velocity spray techniques) of reinforcement particles onto the surface of near net-shape matrix material castings. A major limitation of such methods for these applications is that the spray or deposition is superficial, because it is applied to the surface of solid matrix material castings, and does not substantially penetrate beyond the surface. Additionally, such superficial reinforcement coatings must generally be significantly machined prior to placing the reinforced casting into service. Moreover, absent resurfacing with more reinforcement, the effective service life of such castings is over once the superficial reinforcement layer is worn and/or otherwise degraded. Furthermore, in such superficial reinforcement applications, bonding and integration of the sprayed/deposited reinforcement with the matrix material is limited, even with the most optimal spray/deposition methods.

In further examples, there are substantial deficiencies in making functionally gradient materials having preforms made by methods such as gelcasting methods (see, e.g., U.S. Pat. No. 6,375,877 to Lauf et al), where gravitational or centrifugal forces are used to achieve a vertical composition gradient in molded slurries to form gradient preforms, which may be subsequently infiltrated. Like centrifugal casting embodiments (including that of U.S. Pat. No. 5,980,792), such preform gelcasting methods are relatively slow (particularly when used with high reinforcement particle densities), and are thus too expensive and impractical for most commercial applications. Additionally, in such gelcasting gravitational or centrifugal methods, the attainable variations of particle distributions are limited to layers and/or continuous gradients, and if different reinforcement particle types having differing densities are simultaneously desired/used, it may be impossible to get adequate coordinate (co-localized) particle gradient distributions for the divergent particle types, or to get the different particle types where they are needed, and in the desired pattern. Additionally, preforms made by such gelcasting methods are substantially problematic because of excessive warpage and anisotropic shrinkage occurring during the sintering stage because of different sintering kinetics for the material components. This is particularly true of gelcast preforms made from slurries having less than 60% v. % total solids (see, e.g., U.S. Pat. No. 6,375,877 to Lauf et al., at Example 1)

Therefore, there are substantial deficiencies in prior art selective reinforcement composite material applications, including but not limited to impracticality and lack of versatility (e.g., centrifugation methods), differential CTE problems (e.g., in situ reinforcement member casting, in situ reinforcement 'preform' castings, layered centrifugation methods), limitations on 'preform' thickness/cross-section, superficiality problems (e.g., surface spray/deposition methods), and impracticality and warpage/anisotropric shrinkage problems (gelcasting methods). Moreover, these deficiencies have substantially limited the scope of current casting or forming crafts including, but not limited to: centrifugal casting; high pressure die casting; vacuum die casting; squeeze casting; high vacuum permanent mold casting; low vacuum permanent mold casting; vacuum riserless/pressure riserless casting, surface spray and deposition methods, etc.

There is, therefore, a pronounced need in the art for novel and effective methods and compositions to increase the scope of current selective reinforcement casting or forming crafts by making the methods and compositions more practical (e.g., faster, more cost effective, etc.), more versatile (in terms of the amount, thickness, distribution, pattern and types of reinforcement constituents that can be applied/used), and less susceptible to mechanisms (e.g., differential CTE between materials) that give rise to stress-fracture during formation and/or thermal cycling during service conditions.

There is a pronounced need in the art for more effective methods to produce functional gradient and non-gradient reinforced composite materials with optimum and/or customized properties (e.g., enhanced strength, enhanced mechanical behavior characteristics, weight reduction, improved wear behavior, enhanced surface reactivities and/or properties (e.g., enhanced reactivity between a surface of a composite material and a friction material interacting therewith), enhanced thermal conductivity, low and/or balanced/controlled coefficients of thermal expansion (CTE), reduced residual stress during the forming process and during thermal cycling of reinforced components in service, enhanced recycle potential, reduced fuel consumption, reduced pollutant emissions and green house gases, etc).

There is a pronounced need for cost-effective, high-throughput methods to make variable density preforms, and for novel casting apparatus to make preforms and particularly variable density preforms There is a pronounced need in the art for novel and improved matrix composites (e.g., lightweight brake drums, disk brake rotors, cylinder liners, etc.) comprising such preforms.

SUMMARY OF EXEMPLARY EMBODIMENTS

Particular embodiments provide novel methods of making preforms, and particularly variable density preforms. Certain embodiments provide a variable density preform, comprising: obtaining a slurry comprising at least one reinforcement particle component, and at least one liquid component; obtaining a die cavity having at least one inlet end or orifice and at least one exit end or orifice defining at least one die cavity flow path therebetween and a flow path direction toward the exit end or orifice, the at least one exit end or orifice suitably sized or configured to provide for exit of the at least one liquid component while impeding or blocking exit of the at least one reinforcement particle component; and introducing the slurry under pressure into the inlet end or orifice, wherein the at least one exit end or orifice is operative with the at least one die cavity and flow path to provide for a decreasing pressure gradient along the flow path and flow path direction, and wherein the introducing under pressure is continued for a time sufficient to provide for a variable-density preform having a variable density of the at least one particle component, the particle density increasing in the at least one flow path direction. In particular aspects, the sufficient amount of time for introducing the slurry under pressure is determined by measuring the pressure within the die cavity flow path at at least one position, such as at or near the at least one inlet end or orifice, at a position at or near the at least one exit end or orifice, or at both ends or orifices of the flow path. Certain embodiments comprise agitating or vibrating the die during the introduction of the mixture. In particular aspects, vibrating the die comprises broadband excitation of the die, and in certain embodiments vibrating the die comprises inducing vibrations in the die suitable to provide for inducing flow of the mixture to extremities of the die cavity, and/or to increase the apparent viscosity of rheopectic components of the mixture.

Specific exemplary aspects provide a method of making a variable density preform, comprising: obtaining a slurry comprising at least one reinforcement particle component, and at least one liquid component; obtaining a die cavity having at least one inlet opening or orifice and at least one exit opening or orifice defining at least one die cavity flow path therebetween directed toward the exit opening or orifice, the at least one exit opening or orifice suitably sized or configured to provide for exit of the at least one liquid component while impeding or blocking exit of the at least one reinforcement particle component; and introducing the slurry under pressure, and for a sufficient time period, through the inlet orifice into the flow path of the die cavity to provide for a decreasing pressure gradient along the flow path direction, to provide for a variable-density preform having a variable density of the at least one particle component, the particle density increasing in the at least one flow path direction. In certain embodiments, the sufficient amount of time and the slurry injection pressure are selected to provide for a linear or substantially linear gradient of a particular slurry. Particular aspects comprise measuring the slurry injection pressure at a position at or near the at least one inlet orifice, at a position at or near the at least one exit orifice, or at both ends of the flow path. Particular embodiments further comprise agitating or vibrating the die during the introduction of the mixture. In certain embodiments, vibrating the die comprises broadband excitation of the die. In certain aspects, vibrating the die comprises inducing vibrations in the die suitable to provide for at least one of inducing flow of the mixture to extremities of the die cavity, and to increase the apparent viscosity of rheopectic components of the mixture. In particular embodiments, the die cavity comprises at least one centrally-positioned inlet orifice and at least one circumferentially or perimetrically-positioned exit orifice defining at least one radial flow path and direction, and vibrating the die comprises vibrating a die plate or die portion in a manner that imparts broadband concentric vibration emanating from a position at or near the center of the plate or portion, and wherein the variable-density of the preform increases in the at least one radial flow path direction. In certain aspects, the circumference or perimeter of the die cavity comprises one or more exit openings or orifices that individually or collectively extend continuously or discontinuously around the circumference or perimeter of the die cavity to provide for a concentric radial flow path extending 360 degrees around the at least one centrally positioned inlet orifice, and wherein the variable-density of the preform increases in the radial flow path direction. Certain embodiment of the method further comprise, during introduction under pressure of the mixture into the die cavity, application of a vacuum in fluid communication with the die cavity-distal side of the at least one exit orifice. Certain aspects, further comprise drying the preform to remove residual amounts of the at least one liquid component. In particular embodiments, drying comprises use of a convection oven and/or infra-red radiation. Certain aspects further comprise, prior to drying, lowering the temperature of the preform to a temperature sufficient to induce a phase transition of the at least one liquid component. In certain aspects, the liquid component comprises water, and the phase transition comprises freezing or formation of ice. In particular embodiments, drying comprises microwave drying. In particular embodiments, microwave drying comprises microwave drying with convection or air circulation. In particular embodiments, microwave drying comprises microwave drying under a vacuum sufficient to reduce the pressure in the microwave chamber to lower than atmospheric pressure. Certain aspects further comprise firing or sintering the dried preform by heating it to or at a temperature higher than the drying temperature. In particular embodiments, the slurry additionally comprises at least one fugitive or organic binder component, and firing comprises heating the dried preform to or at a temperature sufficient to effectively remove any residual amounts of the at least one fugitive or organic binder component. In certain aspects, firing comprises heating to or at about 982° C. (1,800° F.) or greater. In certain embodiments, the Reynold's number of the flowing slurry is less than 2,100. In particular embodiments, the slurry additionally comprises at least one component selected from the group consisting of a high temperature or inorganic binder, and a fiber component.

Additional embodiments provide a preform made by the disclosed processes, wherein the preform provides for a porous preform after removal of organic binders or other fugitive components. In particular embodiment the preform is a porous preform.

Further embodiments provide a method of making an infiltration casting, comprising infiltration of the inventive preform with a molten matrix material. In particular aspects, the molten matrix material is a metal or metal alloy. In certain aspects, the metal and alloy comprise aluminum.

Yet further embodiments, provide an infiltration casting, comprising a preform according to the disclosed methods.

Yet further embodiments, provide a brake rotor or drum comprising an inventive preform.

Yet further embodiments, provide a die casting apparatus for casting a preform from a slurry having at least one reinforcement particle component and at least one liquid component, comprising: a die cavity having at least one inlet opening or orifice and at least one exit opening or orifice defining at least one die cavity flow path therebetween directed toward the exit opening or orifice, the at least one exit opening or orifice suitably sized or configured to provide for exit of at least one liquid component of a slurry while impeding or blocking exit of at least one reinforcement particle component of the slurry. In particular aspects, the die cavity comprises at least one centrally-positioned inlet orifice and at least one circumferentially or perimetrically-positioned exit orifice defining at least one radial flow path and direction. In certain embodiments, the circumference or perimeter of the die cavity comprises one or more exit openings or orifices that individually or collectively extend continuously or discontinuously around the circumference or perimeter of the die cavity to provide for a concentric radial flow path extending 360 degrees around the at least one centrally positioned inlet orifice, to provide for production of a variable-density preform with increasing particle density in the radial direction. In particular embodiments, the at least one exit opening or orifice is configured to comprise or be in fluid communication with a filtering element suitably sized or configured to provide for exit of at least one liquid component of a slurry while impeding or blocking exit of at least one reinforcement particle component of the slurry. In certain aspects, the filtering element comprises a plurality of effluent flow channels in open or fluid communication with the filter to provide for variable effluent flow/psi. In particular implementations, a plurality of the effluent flow channels can be individually configured to be in open or fluid communication with the filer element, and with the slurry flow path within the die cavity.

Yet additional aspects, provide a method of making a preform using a die casting apparatus according to the inventive disclosed methods.

BRIEF DESCRIPTION OF THE DRAWINGS

FIG. 1 shows, according to particular exemplary aspects of the present invention, a portion of an exemplary die casting apparatus for manufacture of an inventive variable density preform.

DETAILED DESCRIPTION OF THE INVENTION

Figures 1A, 1B:
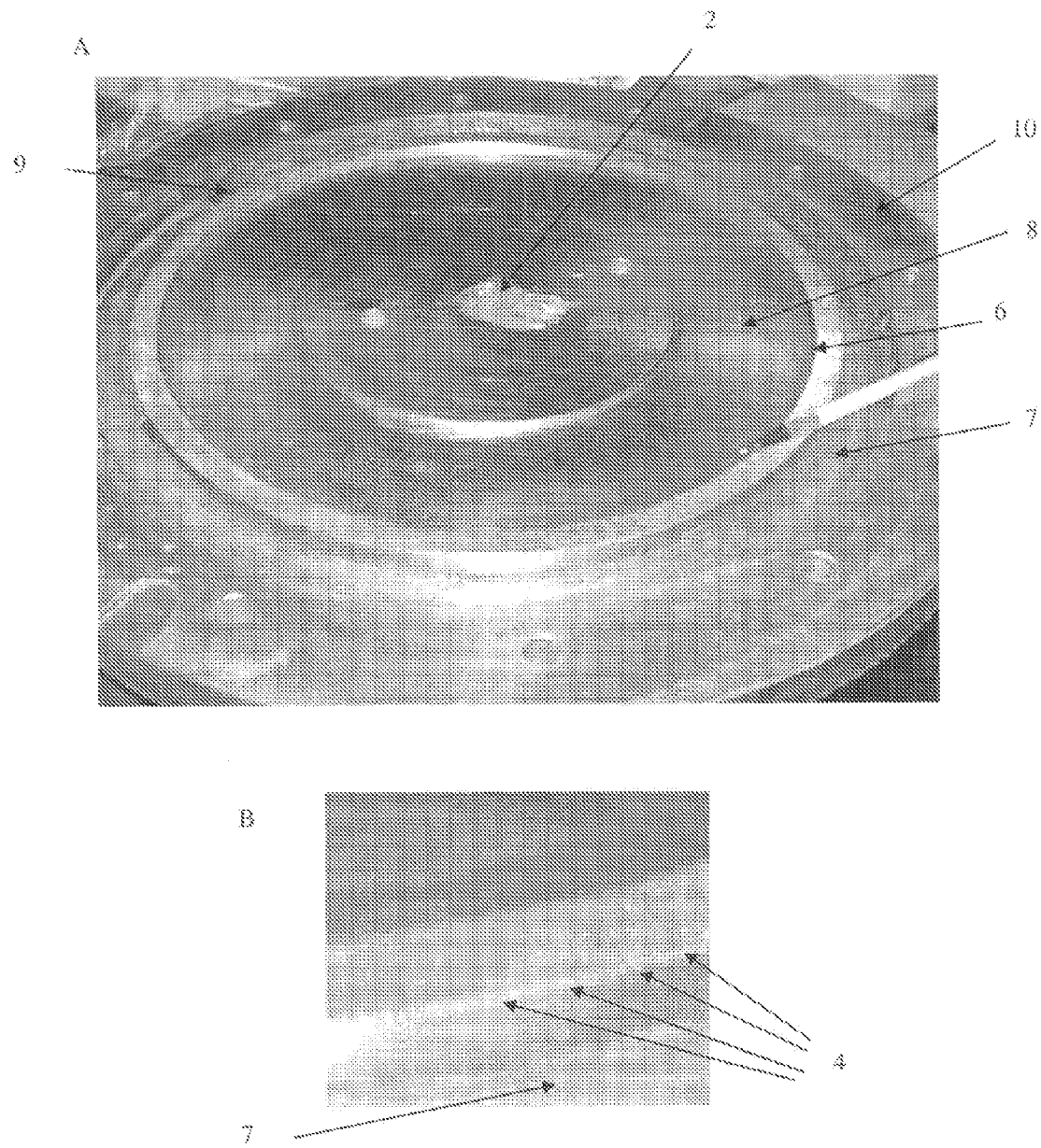
FIG. 1a shows a first effluent filtering die embodiment showing a split die portion 10 of an exemplary annular die casting apparatus (approx. ½ of the die) for manufacture of an inventive variable density preform.
FIG. 1b shows an expanded view of the perimeter 6 of the split annular die portion 10, showing a plurality of radially oriented grooves or channels (exit orifices) 4 circumferentially arranged around the perimeter 6, the grooves or channels suitably sized and configured to permit exit of a liquid component of a slurry while selectively or preferentially precluding or retarding a reinforcement particle component of the slurry

Particular aspects of the present invention provide novel preforms, including variable density preforms, along with novel methods and apparatus for making same. Aspects of the present invention solve a long-standing problem in the art by providing, for the first time, a cost effective, high-throughput method for manufacturing preforms, including variable density preforms. In particular embodiments, the variable densities achieved by the present methods provide for preform applications including but not limited to disc brake rotors and brake drums, wherein the variable density aspect provides for enhanced performance of the matrix composites. For example, disc brake rotors comprising the inventive variable density preforms (e.g., having, for example, a variable density of silicon carbide, etc) not only have increased wear resistance, but also are more resistant to damaging friction and heat effects (heat cracks, spalling, excessive wear, warping, etc.) than non-variable density counterparts, particularly at positions of greater radial distance on the rotor where the surface speed is faster.

Preform Embodiments

Particular embodiments provide a method of making a variable density preform, comprising: obtaining a slurry comprising at least one reinforcement particle component, and at least one liquid component; obtaining a die cavity having at least one inlet end or orifice and at least one exit end or orifice defining at least one die cavity flow path therebetween and a flow path direction toward the exit end or orifice, the at least one exit end or orifice suitably sized or configured to provide for exit of the at least one liquid component while impeding or blocking exit of the at least one reinforcement particle component; and introducing the slurry under pressure into the inlet end or orifice, wherein the at least one exit end or orifice is operative with the at least one die cavity and flow path to provide for a decreasing pressure gradient along the flow path and flow path direction, and wherein the introducing under pressure is continued for a time sufficient to provide for a variable-density preform having a variable density of the at least one particle component, the particle density increasing (e.g., continuously) in the at least one flow path direction. In particular aspects, the sufficient amount of time for introducing the slurry under pressure is determined by measuring the pressure within the die cavity flow path at at least one position, such as at or near the at least one inlet end or orifice, at a position at or near the at least one exit end or orifice, or at both ends or orifices of the flow path. Certain embodiments comprise agitating or vibrating the die during the introduction of the mixture. In particular aspects, vibrating the die comprises broadband excitation of the die, and in certain embodiments vibrating the die comprises inducing vibrations in the die suitable to provide for inducing flow of the mixture to extremities of the die cavity, and/or to increase the apparent viscosity of rheopectic components of the mixture. The reinforcement particle density gradients formed by the inventive methods can assume a variety of shapes and may extend, for example from about 10% to about 70% or greater, about 15% to about 65%, about 20% to about 60%, about 25% to about 55%, about 30% to about 50%, about 35% to about 45%, or shallower gradients. By stepped introduction of different slurries, smoothed step gradient preforms can be made that smooths the particle density transition between 'steps' and thereby reducing differential CTE effects and thermal loading aspects of the preforms and casting comprising such preforms.

In particular embodiments, the at least one exit end or orifice is operative with the at least one die cavity and flow path to provide for a uniform or substantially uniform pressure along the flow path and flow path direction, such that a uniform or substantially uniform preform is obtained having a particle density higher than that of the input slurry. The inventive process is distinguished from the art, inter alia, because more process parameters can be used and controlled to produce different gradients for different applications (e.g., not just rotational speed and temperature). For example, variations in the slurry density, the flock size, the particle size, the particle/fiber ratio, the vibration intensity, average volume fraction (with pressure), etc. are used to produce an 'engineered' reinforcement having superior properties and uniformity.

In certain embodiments of the method, the die cavity comprises at least one centrally-positioned inlet end or orifice and at least one circumferentially or perimetrically-positioned exit end or orifice defining at least one radial flow path and direction. In certain aspects, vibrating the die comprises vibrating a die plate or die portion in a manner that imparts broadband concentric vibration emanating from the center of the plate or portion, and wherein the variable-density of the preform increases in the at least one radial flow path direction. In certain aspects, the circumference or perimeter of the die cavity comprises one or more exit orifices that individually or collectively extend continuously or discontinuously around the circumference or perimeter of the die cavity to provide for a concentric radial flow path extending 360 degrees around the at least one centrally positioned inlet end or orifice, and wherein the variable-density of the preform increases in the radial flow path direction. Such embodiments can provide variable gradient disks or tubes (e.g., for use in application such as disk brake rotors and brake drums).

In additional embodiments, the method further comprises, during introduction under pressure of the mixture into the die cavity, application of a vacuum in fluid communication with the die cavity-distal side of the at least one exit end or orifice.

In yet further embodiments, the method further comprises drying the preform to remove residual amounts of the at least one liquid component. In certain aspects, drying comprises use of a convection oven. In particular embodiments, the method further comprises, prior to drying, lowering the temperature of the preform to a temperature sufficient to induce a phase transition of the at least one liquid component (e.g., freezing). In certain aspects, the liquid component comprises water and the phase transition comprises freezing or formation of ice (phase transition from liquid to solid). In certain embodiments, drying comprises microwave drying, and in particular aspects microwave drying comprises microwave drying with convection or air circulation and/or microwave drying under a vacuum sufficient to reduce the pressure in the microwave chamber to lower than atmospheric pressure.

Particular embodiments of the method further comprise firing or sintering the dried preform by heating it to or at a temperature higher than the drying temperature. In certain aspects such firing or sintering comprises heating to or at about 982° C. (1,800° F.) or greater. In certain embodiments, the slurry additionally comprises at least one fugitive or organic binder component, and firing comprises heating the dried preform to or at a temperature sufficient to effectively remove any residual amounts of the at least one fugitive or organic binder component to provide for a porous preform. In particular aspects, the slurry additionally comprises a high temperature or inorganic binder, and/or a fiber component.

In certain aspects of the method, the flow properties of the slurry within the die cavity are such that the Reynold's number of the flowing slurry is less than 2100.

Additional embodiments provide novel preforms, including porous preforms and porous variable density preforms made by the inventive methods. Preferably, the preform comprises or consists of a porous preform or a porous variable density preform.

Yet further embodiments provide a method of making an infiltration casting or improved matrix composites (e.g., lightweight brake drums, disk brake rotors, cylinder liners, etc.), comprising infiltration of the inventive porous preforms with a molten matrix material. In certain aspects, the molten matrix material is a metal or metal alloy. Preferably, the metal and/or alloy comprises aluminum.

Yet additional embodiment provide infiltration castings or improved matrix composites (e.g., lightweight brake drums, disk brake rotors, cylinder liners, etc.), comprising an infiltrated preform according to the present disclosure.

Yet further embodiments provide a high-throughput preform die casting apparatus as disclosed and described herein, and methods for making the inventive preforms with the inventive preform die casting apparatus.

DEFINITIONS

The term "slurry" as used herein refers to a fluid mixture such as a solution, colloidal mixture or colloidal suspension, comprising at least one particle component (e.g., inorganic particle component), at least one 'fugitive' (e.g., organic) binder component, and at least one liquid component, the mixture having an average particle density. The slurry may optionally include other components such as fiber components (e.g., ceramic fibers, CERACHEM® ceramic fibers) and high temperature binder components (e.g., inorganic binder components).

The term "reinforcement particle component" as used herein refers to essentially any reinforcement particle for which a variable density distribution is sought, and encompasses reinforcement particles (e.g., inorganic particles) to provide strength, durability or some other reinforcement characteristic to the preform. Such particles include, but are not limited to silicon carbide (SiC) particles/powders, alumina ($Al_2O_3$) particles powders, mullite (e.g., $3Al_2O_3.2SiO_2$ with optional additions such as additions of $Zr_2O$ and SiC) particles/powders, Boron carbide ($B_4C$) Boron nitride (BN; c-BN, h-BN), calcined alumina-silica particles/powders (45-

55 to 80-20 Alumina-silica ratio), any suitable (e.g., dense, hard, and stable) ceramic or metal material, silicon metal particles/powders, etc. Such particles can be of a variety of densities and particle sizes. In particular aspects particle/powder sizes is about 59 to about 5 microns, or about 75 to about 45 microns, or about 25 to about 5 microns in diameter. In particular aspects (e.g., the slurries) the particles are present at a particular density or volume fraction or average volume fraction (% reinforcement material at the material composition selected), or preferably vary (variable density) across an aspect or direction of the preform. For example, in the case of a annular composition such as a brake rotor preform, the particle density variation between the outside and inside diameter (in terms of volume fraction) may, in certain aspects, be about 50% V to 25% V, or about 60% V to about 20% V, or about 30% V to about 10% V.

The term 'fugitive binder' as used herein refers to a binder characterized as being selectively modifiable, degradable, or removable from the preform material by virtue of being susceptible to a respective modifying, degrading, or removing means. For example, organic binders include those that can be modified, degraded and/or removed by the application of sufficient heat (e.g., by firing or sintering).

The term "inorganic binder" as used herein refers to inorganic particles that can serve to bind the slurry components, particularly in the cast preform, and particularly even at high temperatures (e.g., high temperature binders), where organic binder fail or are degraded/removed. For example, colloidal silica, consisting of a dispersion of amorphous silica particles can be used as an inorganic binder (e.g., comprising silica particle sizes of the order of less than about 100 nanometers). Other suitable inorganic binders include, for example, phosphate binders, and combination binders, such as aluminum/phosphate binders. Such inorganic binders may serve as surfactants and are used for flocculating, coagulating, dispersing, stabilizing, etc., even at high temperatures.

The term "fiber component" as used herein refers to a reinforcement fiber, including but not limited to ceramic fibers (e.g., $Al_2O_3$-35%; $SiO_2$-50%; $ZrO_2$-15% by weight preferred; optionally 99% $Al_2O_3$ by weight, or fibers that are composed of a mixture of at least two components selected from the group consisting of silica, calcia, magnesia, iron oxides, sodium oxide, or boron oxide; where a 'shot' content of less than 5% ceramic fiber by weight is preferred, or alternatively a shot content of 0 to about 60% by weight, with a shot Size of 100%-44 microns preferred, or a shot size of about 98% 212 microns is possible), glass and polycrystalline fibers, CERACHEM® ceramic fibers, KAOWOOL® alumina-silica fibers, SUPERWOOL® soluble vitreous fibers (silica-calcium oxide-magnesium oxide), SAFFIL® polycrystalline fibers (mullite or high alumina chemistry), alumina fibers, basalt fibers, silica fibers, glass fibers, etc.

The term "infiltration casting" as used herein refers to various art recognized methods of introducing liquid matrix materials (e.g., metals, etc.) into porous matrices of reinforcement material (e.g., rigid porous 'preforms,' fabric, etc.), including as described herein, into the instant preforms and variable density preforms. The inventive methods encompass any appropriate means for such introduction of liquid matrix material, including but not limited to centrifugal casting; high pressure die casting; vacuum die casting; squeeze casting; high vacuum permanent mold casting; low vacuum permanent mold casting; vacuum riserless/pressure riserless casting, surface spray and deposition methods, etc.

A "preform," "porous preform," "variable density preform" or "porous variable density preform" as used herein refers to the inventive 'preforms' suitable for infiltration casting and include, but are not limited to: porous variable density ceramic preforms that contain ceramic particles; porous variable density ceramic hybrid preforms that contain ceramic fibers and particles; ceramic matrix composites; carbon graphite foam 'preforms,' pre-cast Duralcan or other MMC materials formed into a wear liner, etc. In particular aspects, ceramic variable density 'preforms' will comprise ceramic particles to reinforce, strengthen, and increase the wear/abrasive resistance of the cast part. Hybrid ceramic variable density 'preforms' may contain both ceramic particle and fibers, which preferably should not shrink during the firing process (the sintering process that completes the manufacture of the preform). Carbon graphite foam-containing variable density 'preforms' may contain silicon carbide particles, and may be produced so that carbon nanotubes are created during manufacturing thereof to increase the ultimate strength of the final part. Variable density 'Preforms' may be created with functional gradient porosity, which means that during the variable density preform forming process, or during the drying or sintering process, pores of varying sizes are created within the structure of the variable density preforms (or the density of pores may vary to form a gradient). Such porosity gradients can be either continuous, step, or combinations and/or gradations therebetween. The purpose of the functional gradient porosity is to facilitate complete infiltration of the preform and to reduce the abrupt decrease in CTE at the intersection of the unreinforced and reinforced area. This is accomplished, for example in the context of a wear surface embodiment (e.g., brake drum, disk, cylinder liner, etc), by forming a variable density preform having pores on the matrix-proximal side of the variable density preform that are larger than the pores present in the interior of the variable density preform or at the wear surface side of the variable density preform. Alternatively, the pore size could be consistently large throughout the variable density preform, for example, sufficiently large to assist in accomplish the softening of the changes in CTE. Preferably, by design, the variable density 'preforms,' whether ceramic, carbon graphite foam-based (or other composite fiber based) have a porosity (window holes) characteristic. Significantly, according to particular aspects of the present invention, the manufacturing procedure for the 'preform' material is altered to provide areas or gradients of higher or lower quantity or percentage of porosity (window holes). A denser 'preform' typically comprises less porosity (smaller window holes). According to preferred aspects, the inventive high-pressure die-cast selectively reinforced composites comprising the inventive variable density 'preforms' equal or exceed the desired physical strengths normally associated with the traditional forging techniques. Additionally, and significantly, the inventive selectively reinforced composites comprise additional improvements to address coefficient of thermal expansion (CTE) issues, which could result in residual stress at the interface between an abrupt edge or end of a variable density reinforcement 'preform' and the un-reinforced aluminum, etc. Therefore, in particularly preferred embodiments a porosity (window holes) gradient is present in the variable density 'preform', which have larger pores on at least one outer surface of the variable density 'preform' (i.e. the surface next to an interface with the un-reinforced aluminum. Particular aspects of the invention thus provide for a gradual, smoothed transition from more porous, less dense 'preform' material (larger or more numerous window holes) to more dense 'preform' material (smaller or less numerous window holes). This smoothed porosity gradient is associated with a complementary gradient of infiltrated aluminum. The materials gradients created, therefore, obviate the "residual stresses" otherwise encountered at an abrupt interface between the 'preform' and the un-reinforced aluminum (or other infiltration material). The gradual change in window hole porosity provides for particularly beneficial CTE properties in high temperature applications involving substantial heat cycling (e.g., truck wheels, brake disks, etc.). The potential of crack formations from residual stress due to abrupt transitions between materials having mismatched CTE values is substantially reduced or eliminated. Additionally, the 'preform' porosity gradient provides for less capillary action resistance during infiltration casting of the metal or resin that is forced under pressure during casting procedures. Porosity gradient preforms are described by Rau et al (WO2007033378, incorporated herein by reference in its entirety).

"Selective particle enhancement" or "SPE" as used herein refers to a preferred process described herein where, prior to infiltration casting, a porous variable density reinforcement 'preform' (or porosity gradient reinforcement 'preform') is subjected to 'selective particle enhancement' (SPE) involving directed deposition/impingement of selected particles on and/ or penetrating into the porous variable density 'preform' material to provide for selected particle impingement and integration (e.g., extending to a desired depth) within the porous variable density 'preform.' Either 'green' or sintered preforms may be so treated. Preferably, the type of particle or particles used for SPE are selected to impart one or more particular characteristics to the resulting infiltration cast, selectively reinforced composite product. More than one type of particle may be used, particles may have differing properties, sizes, shapes, and densities, and different particle impingement/integration patterns/designs and combinations are encompassed within the present scope. SPE is described by Rau et al., supra.

"Selective particle gradient enhancement" or "SPGE" as used herein refers to a process described herein where, prior to infiltration casting, a porous variable density reinforcement 'preform' (or porosity gradient variable density reinforcement 'preforms') is subjected to 'selective particle gradient enhancement' (SPGE) involving directed deposition/impingement of a gradient of selected particles on and/or penetrating into the porous variable density 'preform' material to provide for particle gradient integration (e.g., extending to a desired depth) within the porous 'preform.' Either 'green' or scintered preforms may be so treated. The direction of such SPGE gradient may be transverse or at an angle with respect to the variable density gradient direction. More than one type of particle may be used, particles may have differing properties, sizes, shapes and densities, and different particle impingement/integration patterns/designs and combinations are encompassed within the present scope. Such SPGE gradients may be continuous gradients, step gradients, or combination or gradations thereof. SGPE is described by Rau et al., supra.

Variable Density Preform Embodiments Optionally Having Porosity Gradient and/or Specific Particle Enhancement (SPE)

Particular aspects provide novel selectively reinforced composite materials and methods for making same involving infiltration casting of liquid matrix material (e.g., aluminum, aluminum alloys, etc.) into porous variable density 'preforms' comprising one or more reinforcement constituents (e.g., SiC, $Al_2O_3$, etc.). In particular embodiments, the porous variable density 'preforms' comprise at least one porosity gradient, with either the pore number or pore size, or both increasing toward at least one 'preform' surface.

In particular embodiments, prior to infiltration casting, the porous variable density reinforcement 'preforms' (with or without the presence of a porosity gradient) are subjected to 'selective particle enhancement' (SPE) involving directed deposition/impingement of selected enhancement particles on and/or penetrating into the porous variable density 'preform' material to provide for selected particle deposition/ impingement and integration extending to a desired depth within the porous variable density 'preform.' Essentially any type of particle or particles is/are used for SPE, and are preferably selected to impart one or more particular desired properties or characteristics to the resulting infiltration cast, selectively reinforced composite product. In particular gradient SPE aspects (i.e., selective particle gradient enhancement; "SPGE"), such SPGE comprises SPE by applying a gradient of deposited/impinged particles. This SPGE particle gradient is distinguished from the variable density otherwise described herein the in the instant, die-cast variable density preforms, and from any 'porosity gradient' that may optionally be present within the preform or any variable density. The inventive methods are broadly applicable to the fabrication of selectively reinforced composite products including but not limited to wheels (e.g., cars, trucks, trains, etc), brake drums (e.g., cars, trucks, etc.), disk brake rotors, cylinder liners and/or cylinder blocks, clutch parts (e.g., pressure plate, center plate, etc), armor (e.g., body armor, field armor), etc. Preferred aspects encompass fabrication of lightweight reinforced composite products, and methods for make same.

Particular exemplary aspects provide novel lightweight selectively reinforced composite disk brake rotors, and methods for making same. Preferred aspects provide novel lightweight selectively reinforced disc brake rotors, having one or more integrated annular wear plates comprising in each case a variable density or porous variable density 'preform' into which matrix material has been infiltrated. Preferably, prior to infiltration casting, the variable density or porous variable density reinforcement 'preforms' (or porosity gradient variable density reinforcement 'preforms') are subjected to SPE as described herein. Preferably, the type of particle or particles used for SPE are selected to impart one or more particular characteristics to the resulting infiltration cast, selectively reinforced composite product. In particular aspects, such SPE comprises SPGE. In particular embodiments, the variable density or porous variable density 'preforms' comprise at least one porosity gradient, with either the pore number or pore size, or both increasing toward at least one 'preform' surface.

Particular aspects provide novel lightweight selectively reinforced brake drums and methods for making same. In preferred aspects the inner tubular members are variable density or porous variable density preforms as described herein, that are integral to the drum, having, for example been infiltration cast in casting of the drum. Particular exemplary aspects provide novel lightweight selectively reinforced brake drums, having an integrated inner tubular member (wear liner) comprising a tubular variable density or porous variable density 'preform' into which matrix material has been infiltrated, and wherein the 'preform optionally comprises reinforcement wrapping (continuous or discontinuous), integrated therein or on the exterior surface, to inhibit expansion of the inner member. Preferably, prior to infiltration casting, the variable density or porous variable density reinforcement 'preforms' (or porosity gradient variable density reinforcement 'preforms') are subjected to SPE as described herein. Preferably, the type of particle or particles used for SPE are selected to impart one or more particular characteristics to the resulting infiltration cast, selectively reinforced composite product. In particular aspects, such SPE comprises SPGE. In particular embodiments, the variable density or porous variable density 'preforms' comprise at least one porosity gradient, with either the pore number or pore size, or both increasing toward at least one 'preform'.

Yet further embodiments provide for novel lightweight selectively reinforced composite cylinder liners and/or cylinder blocks or portions thereof, having integrated cylinder liners, and methods for making same. Preferred aspects provide novel lightweight selectively reinforced cylinder liners and/or cylinder blocks, having one or more integrated cylinder liners comprising in each case a variable density or porous variable density 'preform' into which molten matrix material has been infiltrated. Preferably, prior to infiltration casting, the variable density or porous variable density reinforcement 'preforms' (or porosity gradient variable density reinforcement 'preforms') are subjected to SPE as described herein. Preferably, the type of particle or particles used for SPE are selected to impart one or more particular characteristics to the resulting infiltration cast, selectively reinforced composite product. In particular aspects, such SPE comprises SPGE. In certain embodiments, the variable density or porous variable density 'preforms' comprise at least one porosity gradient, with either the pore number or pore size, or both increasing toward at least one 'preform' surface.

Likewise, selectively reinforced composite clutch disk, clutch pressure plate, and armor (e.g., field armor and body armor) embodiments are encompassed within the scope of the present invention and preferably comprise infiltrated variable density preforms that have been subjected to SPE or SPGE, as defined herein, and optional may comprise variable density preforms having at least one porosity gradient.

In particular embodiments, disk brake rotor, the brake drum, cylinder liner, clutch center plate, clutch pressure plate and armor (e.g., field, body, etc.) embodiments comprise the use of variable density or porous variable density 'preforms' (or porosity gradient variable density 'preforms') comprising carbon graphite foam, which has high thermal and electrical conductivity.

Aspects of the present invention provide novel and substantially improved selectively reinforced matrix composite castings and products, and methods for making same. Exemplary embodiments provide novel selectively reinforced matrix composite products including but not limited to wheels (e.g., cars, trucks, trains, etc), brake drums (e.g., cars, trucks, etc.), disk brake rotors, cylinder liners and/or cylinder blocks, clutch parts (e.g., pressure plate, center plate, etc), armor (e.g., body armor, field armor), etc.

Matrix composites that contain mechanically inhomogeneous multiphase materials (e.g., matrix composites comprising discrete constituent reinforcement) are susceptible to stress/strain damage mechanisms either during the manufacturing forming/solidification process, and/or during thermal cycling under service. Certain aspects of the present invention relate generally to novel cost effective methods of improving fabrication, wear properties, and the behavior (e.g., mechanical behavior) of, and reducing or optimizing the coefficient of thermal expansion (CTE) differentials in matrix composite materials, particularly those behaviors and/or CTE differentials within, and between the two-face boundary interface of selectively reinforced matrix composites comprising infiltrated porous variable 'preforms' (e.g., rigid porous 'pre-forms') utilized in the manufacture of exemplary matrix composites.

Particular aspects provide novel selectively reinforced composite materials and methods for making same involving infiltration casting of liquid continuous phase matrix material (e.g., non-ferrous metals such as aluminum, aluminum alloys, magnesium, magnesium alloys, titanium, titanium alloys, zinc alloys, copper, or resins/epoxies, polymers, plastics, various blends of concrete/cement, etc.) into porous variable density 'preforms' (e.g., with defined shapes) comprising one or more reinforcement constituents (e.g., SiC, $Al_2O_3$, etc.). Various art-recognized means can be used to infiltrate the continuous phase matrix material, in a liquid state, into the porous pre-forms, and such means include but are not limited to use of low/high vacuum, low/high pressure, gravity, or induced centrifugal force (e.g., centrifugal casting, high pressure die casting, vacuum die casting, squeeze casting, high vacuum permanent mold casting, low vacuum permanent mold casting, vacuum riserless/pressure riserless casting, etc.). Exemplary porous rigid perform materials (reinforcement) include but are not limited to ceramics, carbon graphite foam, metallic foam, concrete and other fibrous composites. Typical preferred porous rigid pre-forms comprise a material system comprised of binders and multiphase (discrete reinforcement constituent(s)) materials in various volume fractions. Particular porous rigid variable density 'preforms' contain open-cell porosity (window holes). In preferred porous variable density 'preform' embodiments, at least one porosity (window hole) gradient (or a series of stepped, functionally gradient porosity (FGP) layers) is present with either the pore number or pore size, or both generally increasing toward at least one variable density 'preform' surface, so that there are significantly larger pores on one or more outer surfaces of the 'preform' (e.g., the surface next to an interface boundaries between 'preform' surface and the un-reinforced continuous phase matrix material) relative to, for example, the variable density 'preform' interior or the wear surface area (with friction surface embodiments).

Selective Particle Enhancement ("SPE"). According to particularly preferred aspects, prior to infiltration casting, the porous reinforcement variable density 'preforms' (or porosity gradient, or porosity layered reinforcement variable density 'preforms') are subjected to 'selective particle enhancement' (SPE) involving directed deposition/impingement of selected particles on and penetrating into the porous variable density 'preform' material to provide for selected particle impingement and integration extending to a desired depth within the porous variable density 'preform.' Preferably, the type of particle or particles used for SPE are selected to impart one or more particular characteristics to the resulting selectively reinforced composite infiltration cast product. In particular aspects, such SPE comprises SPE with a gradient of deposited/impinged particles (i.e., selective particle gradient enhancement; "SPGE"). SPGE involves directed deposition/impingement of a gradient of selected particles on and penetrating into the porous 'preform' material to provide for particle gradient integration extending to a desired depth within the porous 'preform.' The direction of such a SPGE gradient may be at an angle or transverse to the direction of the inventive variable density gradient.

In particularly preferred embodiments, a controllable high-velocity deposition/impingement technique (e.g. adjustable high velocity particle 'gun') is used to apply selected particles (SPE) (with significant characteristics that are similar or dissimilar) to porous rigid variable density 'pre-form' (comprising reinforcement material with or without functionally gradient porosity (FGP)) prior to infiltration casting thereof. Preferred particle application methods for SPE or SPGE are those art-recognized automated or automatable methods that are precise and accurate, including but not limited to: cold spray deposition; combustion power spray; high velocity/low velocity oxygen fuel (HVOF/LVOF); plasma spray arc; combustion wire spray; chemical vapor deposition (CVD); physical vapor deposition (PVD), etc.

Different particle impingement/integration patterns/designs and combinations are encompassed. Additionally, a very broad range, and more than one type of particle may be used for SPE and SPGE, include particles having differing chemical compositions, properties and densities. Exemplary materials for particles include, but are not limited to: Silicon Carbide (SiC); Silicon; Alumina Oxides (Al2O3); Magnesium oxide; Tungsten Carbides; Chromium Carbide; Carbon Diamond; Polycrystalline Diamond; Nickel; Copper; Zinc; Titanium Boride; fibrous material (e.g., acrylic fibers, aramid fibers, glass fibers, silica fibers, carbon fibers, metallic fibers, mineral fibers, carbon graphite foam, and mixtures thereof); carbonaceous material (e.g., petroleum coke, metallurgical coke, natural carbon, synthetic carbon and mixtures thereof); iron powder; inert fillers (e.g., whiting, talc, barytes, clays and mixtures thereof) and binders (e.g., resinous binders); metal sulfide-iron powder alloy; metal sulfides, including but not limited to $ZnS$, $FeS$, $MoS_2$, $CuS_2$, $TiS$, $CdS$, $Sb_2S_3$, $MnS$, $CoS$, $Co_3S_4$, $CaS$, $BaS$, $SrS$, $FeS_2$, $ZrS_2$, $Cu_2S$, $Ni_3S_2$, $NiS$, $Ni_3S_4$, $MnS_2$, $CoS_2$, $Co_2S_3$, $SnS$; etc. For example, according to particular aspects of the present invention SPE, of 'preform' surfaces that represent operational friction surfaces (e.g., friction surfaces in brake drums and disc brake rotor embodiments, etc.), using metal sulfides or metal sulfide-iron powder alloys will provide for enhanced functional communication between the selectively reinforced matrix composite friction surface and the friction material of typical brake pads, resulting in substantially decrease stopping distances that will be required, for example, to meet upcoming regulatory deadlines for improved braking in the trucking industry (The National Highway Transportation Safety Administration is poised to recommend that heavy duty brakes provide for a 30% reduction in stopping distances).

Functional Improvements. Through the inventive application of infiltration casting of porous variable density 'preforms,' functionally gradient porosity (FGP) variable density 'preforms' (or variable density 'preforms' with stepped FGP gradient/layers), and preferably using such 'preforms' in combination with selective particle enhancement (SPE, or SPGE), long-standing problems with selectively reinforced matrix composites, such as differential CTE effects, interface debonding, nucleated inclusions, and phenomena such as constraint/deformation mechanisms are reduced or effectively eliminated. The effect of thermal residual stress and growth effects in the base matrix material are likewise improved. The novel selective particle enhancement (SPE) utilized in combination with infiltration casting of porous variable density 'preforms' is a substantial improvement in the overall mechanical behavior and performance of selectively reinforced matrix composites. Mechanical behavior, coefficients of thermal expansion (CTE) differentials, concentration of stresses, and cost-effective methods of manufacture are improved. Likewise, improvements of weight reduction, wear behavior, and recyclability provide for effective, efficient products that reduce fuel consumption, and pollutant emissions including green house gases.

In particular, residual stress created during the manufacturing process of forming and solidification is substantially reduced, and stress damage due to thermal cycling during service is substantially reduced. In preferred aspects, SPE, and particularly SPGE treatment of porous variable density preforms (having a relatively low CTE value) is used to deposit/impinge a material (e.g. particle material) having a CTE value that is intermediate between that of the infiltrated 'preform' and the continuous matrix material. For example, where 356 aluminum alloy is used for the matrix material, and ceramic variable density 'preforms (with or without functional gradient porosity (FGP) or FGF layers) are used, SPGE is used to integrate 390 or 398 aluminum alloy particles (having an intermediate CTE value), or a gradient thereof, into the variable density 'preform' prior to infiltration of the variable density 'preform' with 356 matrix material. A gradual smooth CTE value transition is thereby established across what would otherwise be a two-face boundary interface between the unreinforced matrix material and the 'preform.' Generally, any type of particles that provide intermediate CTE transition/buffering, or that enhance bonding between the matrix material and the 'preform' are suitable for these inventive aspects. This CTE smoothing and/or enhanced bonding is particular effective when SPGE is combined with the use of functional gradient porosity (FGP) variable density 'preforms,' or FGF layered variable density 'preforms,' because mechanical differential issues are relaxed more efficiently by an increased presence and microplasticity of the continuous phase matrix material (because of the larger or more numerous pores at the interface 'preform' surface). According to additional aspects, relative to non-porosity gradient porous variable density 'preforms,' the use of porosity gradient variable density 'preforms' allows for improved SPE penetration/impingement, and also for improved infiltration casting.

The properties of the two-face boundary interface become increasingly important as multiphase materials (discrete constituent reinforcement), usually ceramic, are introduced in making matrix composites (e.g., metal matrix composites (MMC) that can be used at medium and high temperatures). However, when metal matrix composites (MMC) are fabricated at high temperatures and subsequently cooled to room temperature, residual stresses are induced in the composite due to the general mis-match of the thermal expansion coefficients (CTE) between the continuous phase matrix material and the reinforcements (discrete constituents) matrix composite component when exposed to thermal cycling. Therefore, the inventive methods to relax mechanical differential issues within the preform area, and at the two-face boundary interface using SPE or SPGE are particularly beneficial for such applications.

In addition, the inventive methods comprising SPE and SPGE of porous variable density 'preforms' allow for, if desired, coordinate (co-localized) particle gradient distributions for divergent particle types, or to get various particle types where needed or desired, and in the desired or optimal pattern and/or gradient/distribution. Significantly, the present inventive methods remove a major limitation of prior art methods for these applications; namely that prior art spray or deposition methods comprise relatively superficial, non-penetrating particle applications that not only must generally be machined prior to placing the reinforced casting into service, but also, absent resurfacing with more reinforcement, wear out relatively quickly. By contrast, the present methods provide substantial versatility selecting different particle combinations, patterns, and extent of penetration/impingement (integration) into the porous variable density 'preforms.' In particularly preferred wear surface embodiments (e.g., brake drums, disk brake rotors, cylinder liners, etc.), the inventive methods allow for directed deposition of one or more particle types, in essentially any desired pattern and/or gradient, and further provide for particle integration/impingement to depths that correspond to, for example, the effective wear depth of the matrix composite part.

As discussed herein above, suitable infiltration casting methods include, but are not limited to high pressure vacuum die casting, squeeze casting, or any other method that can result in complete infiltration of the variable density preform. In preferred embodiments, the infiltration casting method comprises indirect squeeze infiltration of porous rigid preforms on a shot-control high-pressure die casting machine.

For example, according to preferred aspects of the present invention, the production of high quality selectively reinforced aluminum based metal matrix composite reinforced composite brake drums, brake rotors, clutch wear plates, cylinder liners, commercial wheels or other components, where high wear resistance or high strength are required, can be reproducibly and efficiently produced via indirect squeeze pressurized liquid metal infiltration of ceramic or carbon graphite foam variable density 'preforms' on a shot-control commercial die casting machine.

Preferably, to best accomplish this, the processes of a shot-control commercial die-casting machine are optimized. Typical exemplary processing parameters to be optimized are as follows: preform preheat and melt superheat are preferably adjusted to preclude premature melt solidification before and during infiltration; infiltration speed is preferably controlled to avoid permanent deformation of the ceramic, carbon graphite foam, or other variable density preforms; the maximum pressure available on the die caster is preferably deployed to minimize non-infiltration defects; the gating system is preferably designed to ensure feeding of the solidification shrinkage in the composite casting, etc. Vacuum may be employed to reduce or eliminate voids.

A variable density 'preform' with optimized properties is preferred to provide for complete metal infiltration. For a finished component where repeated thermal cycling occurs, the coefficient of thermal expansion differential between the selectively reinforced area of the component and the unreinforced area could result in component failure. Therefore, in preferred embodiments, the forming of a variable density preform with larger pores at the reinforced and unreinforced interface will assist in providing for a better transition for gradual decrease in thermal expansion within the reinforced area, and is preferred for long-term part integrity. Preferably, such porosity gradient variable density 'preforms' are used in combination with the disclosed SPE and SPGE aspects to substantially further improve smoothing of differential CTE values at the interface. Therefore, a functionally gradient porosity variable density 'preform,' and in particular such a preform in combination with SPE and/or SPGE treatment is a particularly preferred component of such parts as brake drums, brake rotors, clutch plates, and other parts subject to large variations in operating temperatures during initial fabrication and/or service conditions.

In additional SPE and/or SPGE aspects, an increase in the quantity of reinforcement particles (e.g., silicon carbide, alumina, titanium oxide, etc., towards the wear surface of the part provides for optimal wear characteristics, because the wear resistance particles are selectively applied and concentrated at/deposited in/integrated into (preferable to a depth equal to the effective service wear depth of the part) the wear surface/working surface.

Example 1

Novel Variable Density Preforms were Made by an Inventive Preform Die Casting Process This example describes an exemplary method embodiment for making a novel variable density preform.

According to particular aspects, a direct injection technique is used to displace a density of slurry (having a liquid component and a reinforcement particle component) into an inlet opening or orifice of an effluent filtering die cavity. FIG. 1A depicts a first effluent filtering die embodiment showing a split die portion 10 of an exemplary annular die casting apparatus (approx. ½ of the die) for manufacture of an inventive variable density preform. The annular die portion 10 shown has a central inlet 2, and a recessed annular die cavity portion 8. The die cavity portion 10 has at least one exit opening (e.g., end, opening or orifice(s)) 4 at a die cavity perimeter 6, defining at least one flow path between the inlet and exit (e.g., end, opening or orifice(s)), the exit sized and/or configured to permit exit of a liquid component of a slurry while selectively or preferentially precluding or retarding a reinforcement particle component of the slurry. FIG. 1BA shows an expanded view of the perimeter 6 of the split annular die portion 10, showing a plurality of radially oriented grooves or channels (exit orifices) 4 circumferentially arranged around the perimeter 6, the grooves or channels suitably sized and configured to permit exit of a liquid component of a slurry while selectively or preferentially precluding or retarding a reinforcement particle component of the slurry. Also shown is an outer effluent flow and drain trough or channel 7 in fluid communication with the die cavity distal portion of the plurality of radially oriented grooves or channels (exit orifices) 4, and with a vacuum source (not shown) by means of a vacuum channel 9. The effluent drain channel directs filtered effluent away from the die cavity and preform operatively facilitating formation of the particle gradient preform.

Figure 2:
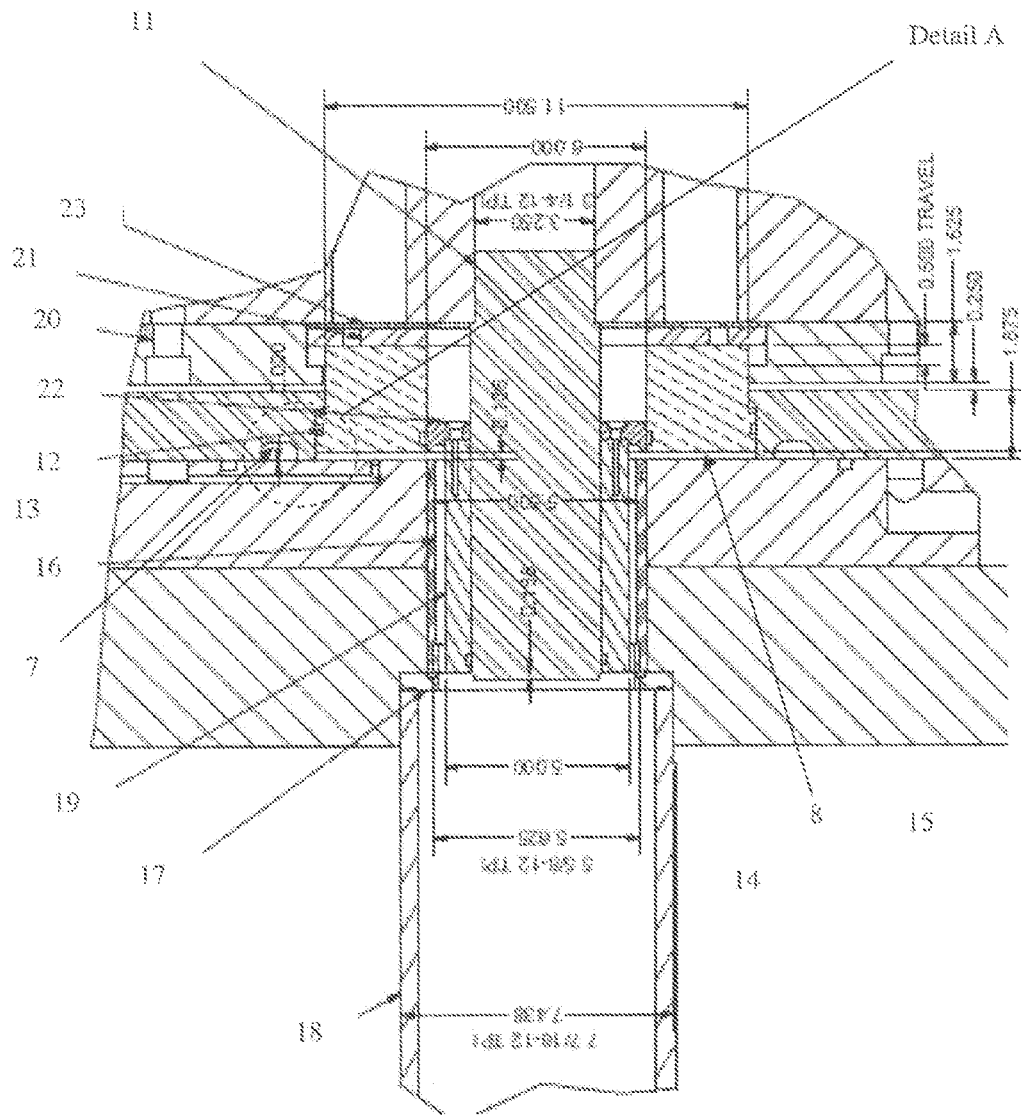
FIG. 2 shows, according to particular exemplary aspects of the present invention, an exemplary die casting apparatus embodiment for high-production (high-throughput) casting of inventive preforms.

FIG. 2 shows an exemplary apparatus for making variable density preforms according to particular embodiments the present invention. The apparatus comprises an effluent filtering die cavity 8 according to particular aspects. A preform slurry hole plug 11 facilitates control and directing of slurry into the die cavity 8. A top ejector die portion 12 is shown, along with a top floating die plate 13. A lower platen 14 and lower die potion 15 are shown. An injector sleeve-outer wall 16 is depicted, along with a shot sleeve/injector sleeve seal plate 17, shot sleeve 18 and injector sleeve inner tube 19. A top fixed plate die portion 20 is shown, along with a top floating die holding plate 21. A preform shear ring 22 is shown, along with a preform thickness shim plate 23. An effluent flow and drain trough or channel 7 is shown.

Figure 3:
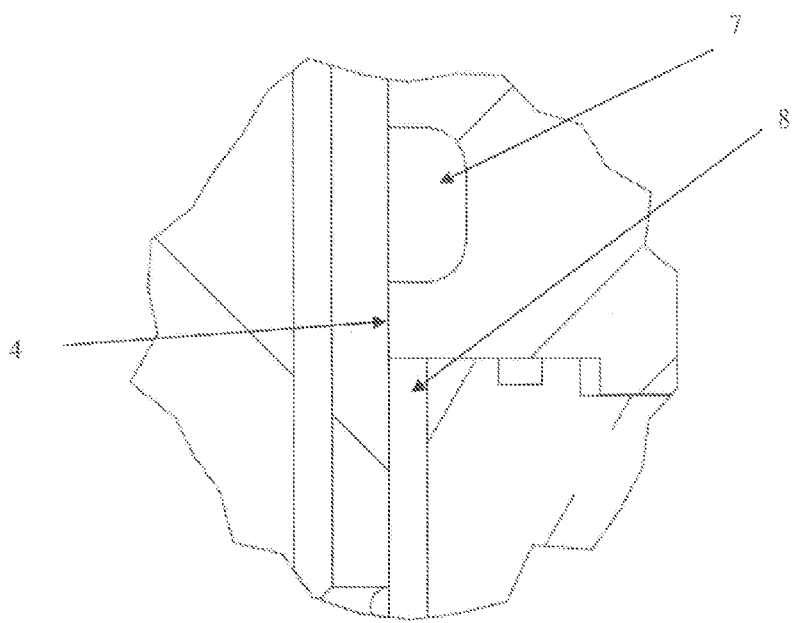
FIG. 3 shows, according to particular exemplary aspects of the present invention, an expanded view of a section of the die casting apparatus of FIG. 2.

FIG. 3 shows an expanded view of Detail A of FIG. 2. The components cooperatively function to provide for a novel method for making a variable density preform. For example, the device can be used in a method of making a variable density preform, comprising: obtaining a slurry comprising at least one reinforcement particle component, and at least one liquid component; obtaining a die cavity 8 having at least one inlet end 2 or orifice and at least one exit end 4 or orifice defining at least one die cavity flow path therebetween and a flow path direction toward the exit end or orifice 4, the at least one exit end or orifice suitably sized or configured to provide for exit of the at least one liquid component while impeding or blocking exit of the at least one reinforcement particle component; and introducing the slurry under pressure into the inlet end or orifice, wherein the at least one exit end or orifice is operative with the at least one die cavity and flow path to provide for a decreasing pressure gradient along the flow path and flow path direction, and wherein the introducing under pressure is continued for a time sufficient to provide for a variable-density preform having a variable density of the at least one particle component, the particle density increasing (e.g., continuously) in the at least one flow path direction.

Figure 4:
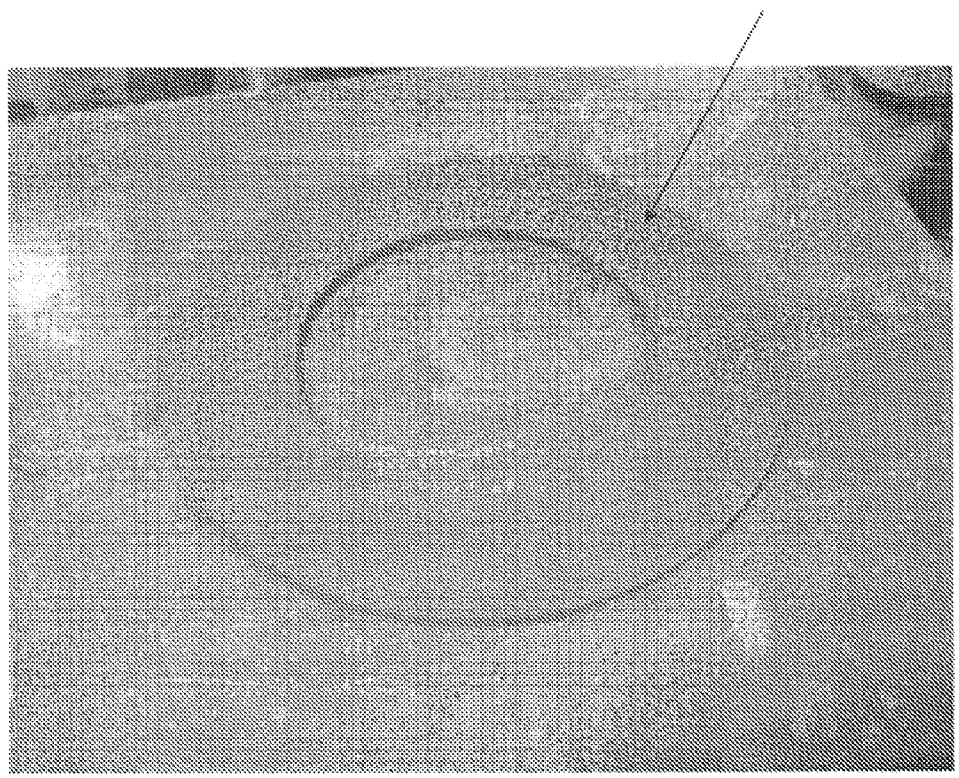
FIG. 4 shows, according to particular exemplary aspects of the present invention, a variable density preform made according to the present inventive method.

FIG. 4 shows an inventive particle gradient preform 24 made by the process and device described above. The reinforcement particle density gradients (e.g., linear or substantially linear gradients) formed by the inventive methods can assume a variety of shapes and may extend, for example from about 10% to about 70% or greater, about 15% to about 65%, about 20% to about 60%, about 25% to about 55%, about 30% to about 50%, about 35% to about 45%, or shallower gradients. By stepped introduction of different slurries, smoothed step gradient preforms can be made that smooths the particle density transition between 'steps' and thereby reducing differential CTE effects and thermal loading aspects of the preforms and casting comprising such preforms.

The effluent filtering die, or a portion thereof, is preferably vibrated during the slurry injection, with, for example, broadband excitation in order to induce annular vibrations in the die to induce flow to the outer extremities of the cavity and also to take advantage of the rheopectic (i.e., viscosity increases as a function of time with broadband excitation) of the slurry in facilitating gradient formation. Preferably, a vacuum is applied to the die cavity distal side of the exit orifice (preferably with the vibration) to drop the vapor pressure to assist in the evacuation of moisture from the cast preform. The flow path within the die cavity is of a distance and configuration sufficient to provide for a pressure drop as a function of length along the flow path to promote formation of a variable density preform casting. Preferably, flow characteristics/properties of the slurry and the configuration of the die cavity flow path are selected to maintain a laminar flow in the cavity while it is filled to avoid or preclude significant areas of entrapped air and deleterious void formation.

During the injection of the slurry under pressure, and in the presence of the decreasing pressure gradient along the flow path toward the exit orifice(s), the liquid component exits the exit orifice leaving an increasing density of reinforcement particle component adjacent the exit orifice and extending back with decreasing density in a direction toward the inlet orifice, wherein the reinforcement particle density decreases in a direction toward the inlet orifice (the density increasing in a direction toward the exit orifice). Preferably, a linear or substantially linear (e.g., no more than about 2%, 5%, 10% or 20% deviation from linear) particle gradient is formed.

After injection (e.g., for a time sufficient to provide for a variable density preform having a desired density gradient), the cast preform (die insert) is removed and optionally placed into cryo-chamber to break the Van der Waals bonds between the colloid and the liquid (e.g., water) upon phase transformation of the water (freezing). This allows the water to exit without disturbing the inorganic binder system. Various heating techniques may be used to dry the preform. For example, drying may comprise at least one of the following: microwave drying; microwave drying with convection; microwave drying with vacuum; continuous pass-through convection oven, infra-red drying, etc.

After drying, the dried preform is placed into, for example, a kiln, furnace, or oven and fired or sintered at or to specific temperature (e.g., typically significantly greater than the drying temperature.

Various exemplary process steps are encompassed by and/or compatible with the inventive methods and are briefly summarized below.

Slurry mixing may, for example, be by mixing the slurry in a tank with a single shaft and double propeller, where the shaft makes an angle of ten degrees with the vertical axis of the tank.

Vacuum forming may be employed, involving the coagulation of slurry flocks on a permeable surface in order to allow passage of water but not the slurry, wherein water passes due to a pressure gradient established by the low absolute pressure induced by a vacuum.

Injection molding may be employed, involving the injection of the slurry into a die cavity by means of a conventional injection molding machine. Slurry Extrusion may be employed, involving the injection of the slurry into a die cavity with the assistance of a cylindrical impulse generator. Slurry Extrusion w/vacuum assist may be employed, involving the injection of the slurry into a die cavity with the assistance of a cylindrical impulse generator with the cavity previously evacuated.

Moldable extrusion may be employed, involving the extrusion of the slurry over a mandrel on order to form a continuous cross section shape.

Slurry de-watering techniques may be employed, involving the design of suitable fluid passages in the die to allow the process fluid to 'bleed-off' during the formation of a preform.

Die forming-Compression molding of an injected slurry mixture may be employed, wherein dense slurry and can be the preform precursor in a mold before filling the voids with high pressure injected slurry.

Coriolis segregation techniques may be employed, allowing for a density gradient of material to form as a function of Coriolis acceleration of a fluid being provided impetus from slurry rotation. Acoustical Coriolis particulate segregation may be employed, wherein the circular vibration patterns of acoustical emission are used to enhance the effects of the Coriolis acceleration the particulate undergoes due to their driven motion.

Vibrating annulus assisted slurry flow processing may be employed, involving the vibration excitation of a flat plate in a manner that imparts broadband concentric vibration emanation from the center of the plate. Vibration ceramic slurry knitting processing may be employed, involving the rewetting of the preform material via the reduced surface tension effects caused by vibration excitation. Vibration annular membrane assisted slurry flow may be employed, wherein this process is a larger amplitude version of due to the fact that a membrane is used instead of a more rigid plate. Broadband impact excitation for vibration excitation may be employed, involving imparting of broadband excitation of dynamic systems by using impact of materials with inherently high ratios of modulus to density to ensure ultrasonic resonances of the system are excited.

Microwave drying may be employed, involving the use of radio frequency to dry the preform. Microwave firing may be employed, involving the use of RF to excite the preform to temperature in excess of the drying temperature in order to drive off the organic material and set the inorganic material to hold the preform together during further processing. Microwave vacuum drying may be employed, and with the optional addition of a vacuum in order to allow the water to more readily turn to vapor. Microwave vacuum firing may be employed, and with the addition of a vacuum in order to allow for constituent oxide reduction due to the firing process.

Ionization density control may be employed, involving the ionization of the process fluid or fluids in order to produce a repulsive or attractive charge between constituents in order to organize the preform material.

Drying using inductive receptive materials may be employed, involving induction drying using a receptive material and conduction to dry the preform material.

Variable annular density lay-up may be employed, involving the use of bands of varying density preform material in order to create a functionally graded preform.

Reaction inclusion infiltration enhancement may be employed, involving the use of nano fillers in order to control the reaction kinematics to ensure a net exothermic response from the infiltration process. Nano-reinforcement may be employed, involving the use of Nano sized reinforcements and property enhancement to increase the macro-properties and process mechanisms, such as reduced viscosity. Nano-dispersive vibration technology or de-agglomeration technology may be employed, allowing for the fine scale dispersion of nano sized particles in the preform. Nano-coating application may be employed, allowing for the preform to be coated in order to enhance infiltration characteristics.

Microwave die cavity heating may be employed, use of an RF wave guide constructed to be attached to the die in order to use the die cavity as an RF container and preheat the preform and fire it right in the casting mold as a rapid heat technology. The RF essentially bounces off the metallic surfaces and only heats the preform material, and won't allow the preform to take energy from the liquid melt causing premature freeze off of the infiltration metal.

Vibration assisted slurry flow may be employed, allowing for the 're-knitting' of preform materials in a non-slurry state. Nano-vibe slurry wetting techniques may be employed.

Rheopectic visco-elastic shape forming may be employed, involving exploitation of the non-Newtonian fluid properties of the slurry and high shear rates in order to press the material vertically without have the material 'squish' laterally. Split-Hopkinson pressure bar die excitation may be employed, allowing for precise wave propagation control in the die excitation. The pulse and wave length can be physically varied from a square wave or a triangular wave.

Acoustical selective particle deposition may be employed, involving the use of standing wave and plane wave patterns in order to order the particulate/fiber variation in the preform material. Acoustical excitation for slurry flow processing may be employed, involving use of acoustical excitation in order to assist the motion of the material to create the desired functional gradient. Acoustical multi-node selective density resolution techniques may be employed, involving creation of nodules of particles at the node in the slurry in order to spatially segregate preform materials in a slurry. Acoustical multi-mode excitation technique may be employed, involving the use of acoustical excitation for the forming of a preform. Acoustical emission non-destructive evaluation may be employed, involving the use of acoustical emission for a cost effective method to determine spatial resolution.

Hydrogen assisted vacuum forming may be employed, involving the burning of hydrogen in the pores of the preform material to create 'local' vacuum to further compact particles therefore increasing the green strength and density of the preform.

Hydrolysis drying may be employed, involving applying an electric current through the preform material in order to convert the process fluid to its gaseous constituents. Vacuum sublimation drying may be employed, involving sublimating the water instead of evaporating the liquid water form the preform.

Destructive ceramic extreme broadband excitation may be employed, involving encapsulating the die in ceramic material and then impacting and breaking the material in contact with the die, wherein broadband (>20 kHz) mechanical vibrations are transferred to the die and thereby excites the die cavity and any fluid and particle in the cavity. Kinematics structure amplification for vibration excitation may be employed, involving placing cantilever beams, pendulums, or 1 degree of freedom linkages on the die cavity and exciting them with a vibrator at their natural frequencies and thereby transferring more mechanical energy to the die than from attaching a vibrator directly to the die.

Drag-flow induced density gradient techniques may be employed, involving flowing a fluid, such as hot air or water, through or over a preform in the die to cause the smaller particles to migrate to one side of the die in order to create a density gradient through the section or surface of preform. Flow modified green strength may be employed, involving flowing a fluid, such as hot air or water, through or around a preform in a die such that it will cause the particles to be compacted, thereby changing the green strength of the preform material prior to drying or firing.

Magnetically induced gradient control may be employed, involving coating the preform fibers/particles with magnetic materials or adding magnetic particles to the preform mixture and applying magnetic fields to the structure to disperse the particles within the preform according to the strength and location of the magnetic fields, thereby tailoring/customizing preform properties such as density and green strength.

Vibration assisted wetting technique may be employed, involving applying mechanical or acoustic vibration to the fluid via die vibration, vibration of the particles directly at a physical interface like a membrane, or acoustic excitation of the fluid within the preform to help spread out or wet the fluid on the preform particles evenly and reduce unwanted density variations due to uncontrolled clumping.

Super-critical gel density control may be employed, involving causing the contents of the preform to foam under load pressure due to the presence of a super-critical fluid. The foam will cause the density of the gel in the preform to change, thereby changing the density of the preform. Acoustical super-critical fluid resonance may be employed, involving applying mechanical or acoustic vibration at a resonance of the preform die cavity at low pressure in the presence of a super-critical fluid to help foam and distribute the particles evenly within the foamed preform.

Cryo-sublimation drying may be employed, involving freezing the preform via, for example, liquid nitrogen and then drying it either under vacuum or heating rapidly using a flame. This helps hold dimensional tolerances and preform integrity during drying.

Structure tuned damping isolation may be employed, involving controlling the composition and density of the preform selectively, wherein the entire reinforced part can be tuned with a prescribed mount of structural damping to help reduce vibration and noise.

Visco-elastic constituent control may be employed, involving adding non-viscous fluids like polyolefins to the slurry to help reduce viscosity during forming and help create a thin boundary layer around inserts within the preform to provide for ease of removal from the die and help facilitate bonding between the particles and fibers within the preform.

Tailored energy dissipation may be employed, involving changing the composition of the preform at different selective locations within the part, wherein the amount of heat and acoustic energy dissipated from the part can be altered for desired function. Changes in reinforcement gradient can help pull heat away from contact areas on a brake and allow for those areas to have more wear resistance with greater amounts of ceramic reinforcement.

Convolution slurry mixing may be employed, involving selectively placing obstacles within the flow channels to the preform slurry, wherein a turbulence will be created to help mix the preform slurry during forming or extrusion. Multivariate material inclusion optimization may be employed, involving monitoring the modal or acoustic properties of the preform during forming at various locations, wherein a multivariate time series model can be monitored, to help monitor, control, and optimize the locations of the inclusions within the reinforcements to give the correlated properties of the preform to the desired functional properties of the part.

Upper and lower Darboux sum prognosis may be employed, wherein the material properties of the preforms can be controlled precisely according to different geometries within the part. For instance, a part will have more reinforcement at areas critically affected by load, characterized by high stress. The material will have a lower bound for the material properties, where the reinforcement is the least. By using this information, the part reliability can be predicted using an upper and lower bound analysis assuming the range in material properties.

Supremum variation control may be employed, wherein the amount of material variation can be controlled by changing the composition of the preform. The ultimate tensile strength of the material does not necessarily reflect the strength of the part, especially in a composite. The supremum variation is defined as the predicted strength of the part under a prescribed set of torsional, bending, and axial loads. The reinforcement locations with respect to the stress concentrations within the part dictate the total strength of the part. By predicting this strength, the overall strength variation of the part can be controlled.

Mobile property control may be employed, involving selectively placing reinforcements and reinforcement gradients throughout the part to help tailor/customize the thermal and physical properties of the part, such as strength, density, CTE, natural frequency, etc.

Deleterious effects minimization may be employed, wherein undesired porosity and impurities can be minimized during forming by vibrating mechanically or acoustically or electrometrically to help air and water escape during the forming process, which prevent cracking and warping during drying.

Sustainability system control may be employed, wherein the preform materials are recyclable, which allows for any scraps or excess materials to be utilized.

CTE tailoring may be employed, involving adding reinforcement to the part to reduce CTE, whereby thermal stresses can be alleviated if the CTE is changed according to the geometry of the part. For instance, the outer diameter of a homogeneous brake rotor will grow more than the inner diameter of that same brake rotor, thereby creating diametrical thermal strains. By increasing the reinforcement along the exterior of the part and decreasing the reinforcement along the interior of the part, the thermal strain can be neutralized and thereby the thermal stress reduced.

Heat dissipation in, in-situ forming may be employed, wherein the preform variation can also aid heat dissipation during forming and drying. By adding heat dissipation paths of higher density reinforcements, more heat can be drawn to the surface of the preform during forming and drying.

Metronome vibration excitation may be employed, involving impacting the die with a hammer according to the pulse of a metronome.

According to various aspects of the present invention, the aforementioned process or series of processes are utilized to create a controlled density preform for multifunctional materials. The controlled density can be utilized in but are not limited to braking components, engine components, vehicle suspension components or any other component that would need tailored differential densities inside of ceramic reinforcements for metal matrix composites or insulation. One of the most important aspects of the variable density preforms is the ability to reduce the thermal loading of components (e.g., the MMC component). Such loading can and does cause premature failure in specific components.

Example 2

Novel Variable Density Preforms were Made by Another Exemplary Inventive Preform Die Casting Device and Process This example describes additional exemplary method and device embodiments for manufacturing novel variable density preforms. The process of making an MMC component is delineated in detail in this Example.

A porous 'preform' is a precursor reinforcement material that can be infiltrated with matrix material (e.g., aluminum, aluminum alloys, etc) to make an MMC component (e.g., a reinforced composite). Basic exemplary steps for making the inventive preforms are as follows:

1) measuring of the constituents (e.g., weighing);
2) mixing (e.g., batch mixing) of the constituents;
3) formation of 'green' preform geometry (e.g., by using the inventive devices);
4) drying of the preform under conditions suitable to support correct preform geometry;
5) optional machining of the preform (e.g., to final net shape); and
6) 'firing' of the preforms (e.g., sintering at elevated temperature to eliminate organic binders and/or other fugitive components of the slurry).

Mixing station. A mixing station provides a starting point for the ceramic preform manufacturing process. A suitable blend of ceramic particles, fiber, binders and water are measured and mixed to obtain a ceramic slurry suitable for forming in the inventive preform press to provide variable particle density preforms. The slurry blend is important for obtaining a MMC component having high structural integrity and properties tailored, for example, for a vehicle braking (e.g., disk or drum brake) application. An on-site mixing station provides for reproducible preform production and allows for responsive design and property tailoring, based on mechanical and microstructural analysis of castings made with the precursor materials. Weighing of the constituents into receptacles (e.g., one gallon pails) is readily accomplished using, for example, a calibrated scale. In particular embodiments, individual constituents may comprise: (1) silicon carbide; (2) silica; (3) starch; and (4) SAFFIL® fiber.

Figure 5:
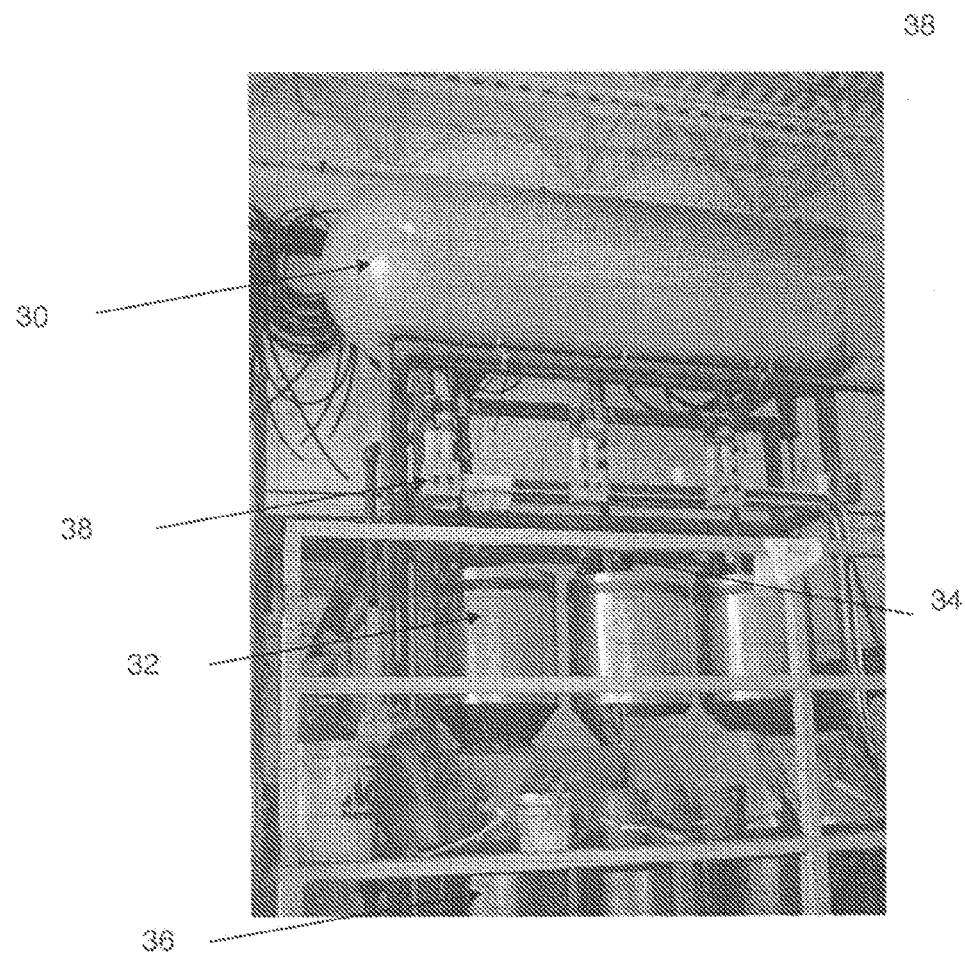
FIG. 5 shows an exemplary preform slurry mixing station according to aspects of the present invention.

An exemplary mixing station is shown in FIG. 5. The mixing station 38 comprises one or more water tanks 30, and one or more mixing tanks 32 equipped with mixing motors 34. In certain aspects, the mixing is accomplished with a high shear mixing propeller. The mixing tanks 32 communicate with respective holding or settling tanks 36. Cycling controls 37, facilitate control of the flow of liquids and slurries through the system 38. A typical preform batch mixing procedure may, for example, comprise: (1) filling a mixing tank with 30 gallon of water; (2) adding 0.5 lb of AZS fiber (SAFFIL®) and mixing (e.g., for 5 min. at 1,150 rpm); (3) adding 8.5 lb. SiC and mixing (e.g., for 5 min. at 1,150 rpm); (4) adding 1.6875 lb. colloidal silica and mixing (e.g., 1 min. at 1,150 rpm); (5) adding 0.45 lb. starch and mixing (e.g., for 5 min. at 1,150 rpm); and (6) pumping the mix into a holding tank or tanks.

Inventive effluent filtering preform die press. After the desired slurry has been properly mixed, it is ready for forming into a porous preform (e.g., suitable for infiltration casting with a matrix material). The design of the effluent filtering preform press is such that preform densities can be varied through the formed component. Extensive testing, design and flow analysis has gone into developing a system which is capable of forming rotor preforms with the desired, tailored and optimal density variations in the radial direction. In preferred aspects, the particle gradients are linear or substantially linear, increasing in the radial direction, and having uniform, or substantially uniform density around circumferential positions at any given radius.

Exemplary specific process steps for making the inventive variable density preforms include one or more of the following:

1. Injecting (e.g., using a direct injection technique) a slurry into an effluent filtering die cavity (see FIGS. 7-11 illustrating aspects of the exemplary effluent filtering dies used herein), where in particular aspects injecting the preform slurry into the die cavity is from a shot cylinder positioned below the die such that when the slurry reaches the tapered end of the shot cylinder, the velocity of the slurry is increased thereby accentuating the density differences of the carrying liquid media and the ceramic particles/fibers;

a—vibrating the die with broadband excitation in order to induce annular vibrations in the die in order to induce flow to the outer extremities of the cavity and also to take advantage of the rheopectic (viscosity increases as a function of time with broadband excitation) of the slurry;

b—maintaining a sufficient die travel distance to provide and maintain a pressure drop as a function of length to facilitate variable density preform formation;

c—adjusting or providing for flow characteristics to provide for a substantially laminar flow in the cavity during filling to preclude entrapped air and formation of deleterious voids.

As the slurry enters into the die cavity, there is a propensity for the liquid media to begin to separate from the heavier ceramic slurry. Upon hitting the periphery (outer ring) of the die cavity, the ceramic slurry is stopped, but the liquid media (effluent) is able to escape or filter out through a path that is gated or filtered before connecting to the effluent channels (see FIG. 9). The slurry is continually injected into the die and there is a continuous separation of effluent and ceramic particles/fibers. The effluent must travel through the ceramic material already in the die cavity causing an increased particle density of the outer regions of the die. With the die completely filled, pressure is built in the die to promote the release of the effluent in the die cavity. The hold time and pressure are important control parameters for controlling the exiting flow and thereby controlling the density gradient across the final preform.

Figure 6:
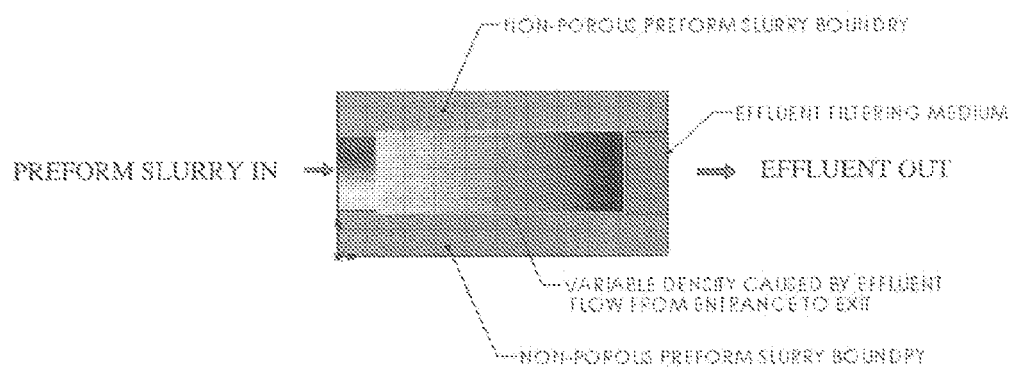
FIG. 6 shows, in schematic form, the principal of variable density preform formation according to particular aspects of the present invention.

FIG. 6 shows, in schematic form, the principal of variable density preform formation according to particular aspects of the present invention. The slurry is ejected in the cavity from the left side of the figure and as the slurry reaches the right side of the cavity having effluent filtering means (e.g., suitably sized openings, channels, mesh, screens, filter particles, etc.) only the effluent can escape the die cavity, thereby providing for building up of a functionally graded and ceramic (e.g., porous ceramic preform).

2. Removing the preform from the effluent filtering die and placing it for drying (e.g., in a infrared convection oven to drive out the remaining moisture in the preform).

3 Placing the preform into a furnace and ramping the temperature to a sufficient value to burn out the organic binder and to set the inorganic binder on the ceramic particles and fibers. This drives out carbon residue from the preform and gives the preform strength. As will be appreciated in the art, the method of elimination of binders and/or other fugitive components from the preform will depend on the nature of the binder or fugitive agent, and may be other than heat.

Figure 7:
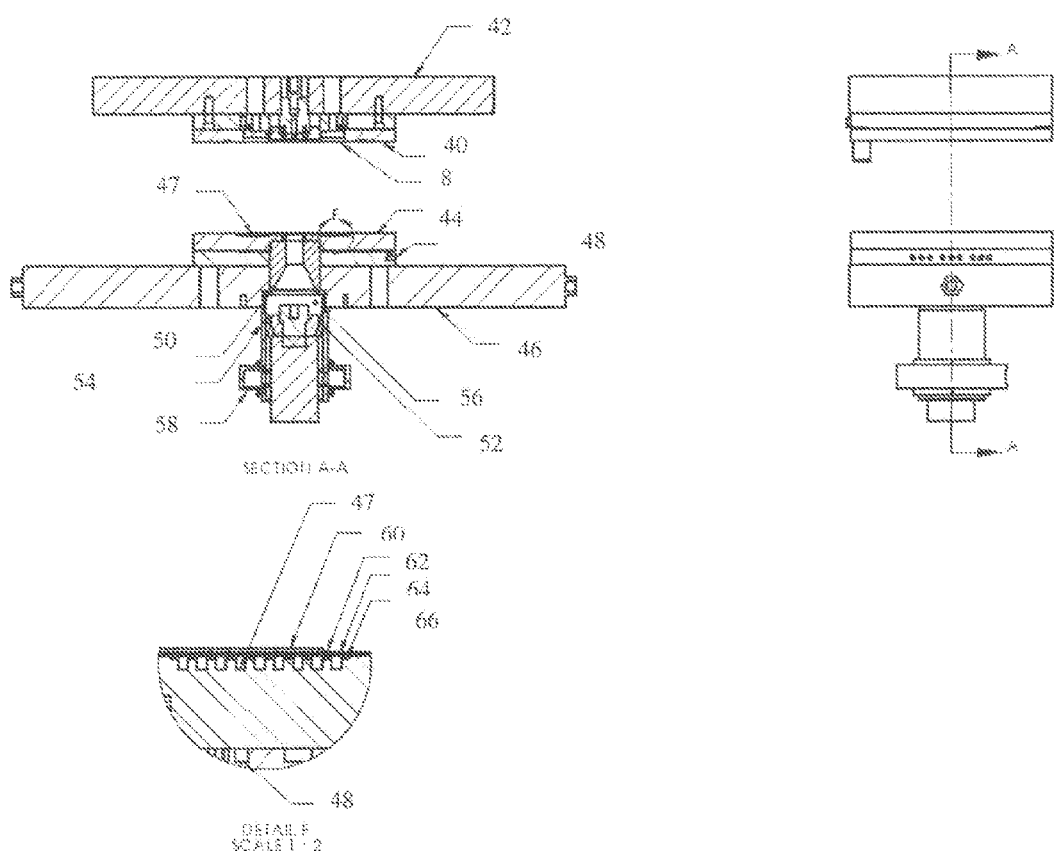
FIG. 7 shows a schematic of a preferred effluent filtering die design embodiment for the manufacture of the inventive functionally gradient preforms.

FIG. 7, Section A-A, shows a schematic of a preferred effluent filtering die design embodiment for the manufacture of the inventive functionally gradient preforms. An upper die 40 is connected to an upper platen 42. The upper die 40 comprises a die cavity 8. The upper die communicates with a lower die 44 connected to a lower platen 46. There is a plurality of effluent flow channels 47 and effluent drain channels 48 within the lower die portion. Slurry is delivered into the die chamber through a shot nozzle 50 by means of an injection cylinder 52 within a shot sleeve 54. Also shown are slurry cavity 56 and slurry load reservoir 58.

Figure 8:
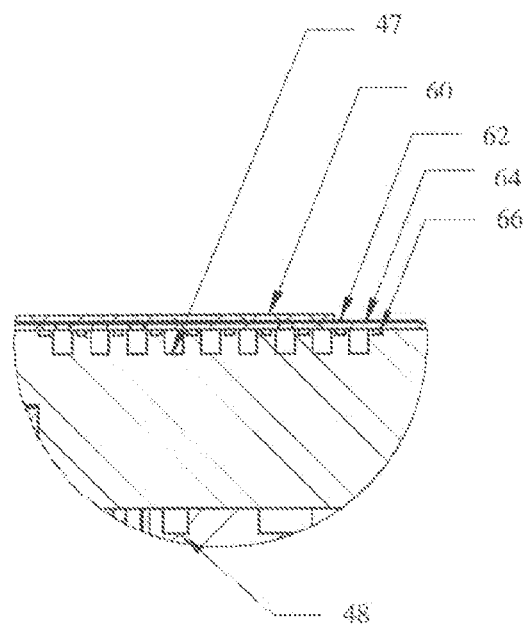
FIG. 8 is an expanded view of Detail "F" of FIG. 7.

Detail "F" shows an expanded view of the effluent flow channels 47 and effluent drain channels 48 within the lower die portion. Also shown in Detail "F" are a filter cover plate 60, a filter member 62, discharge cover plate 64 and o-ring grooves 66. According to preferred aspects the assembly design shown in FIG. 7 and Detail "F" provides for effective making of variable density preforms using smaller particulate diameters. FIG. 8 is an expanded view of Detail "F". The slurry initially enters the die and displaces the initial resident air out through the effluent flow and drain channels. During filling of the die, the slurry is forced toward the outside of the die (because the slurry injection gate is at the center), through the filter under the filter cover plate, and further through the openings in the discharge cover plate, and finally out through the effluent flow channels, which are connected to the effluent drain channels connected to a drain. According to particular aspects of the present invention, the arrangement of the covered filter and the plurality of concentrically configured effluent drain channels provides for additional control the pressure across the die to facilitate production of a particle gradient. In particular aspects, a varying number of the concentrically configured effluent drain channels can be opened and/or placed in fluid communication with the filter and effluent flow through the filter, with one or more of the drain channels optionally closed and/or blocked from fluid communication with the filter. For example, in the reverse radial direction from the perimeter, only a subset of the concentrically configured effluent drain channels can be opened and/or placed in fluid communication with the filter. In preferred aspects, the outer 2-4 channels are used to direct and drain the effluent flow from the filter. Preferably, at least the outer 3 channels are used (e.g., with the 6 inner channels blocked and the three outer channels open). Each effluent channel is connected to a corresponding effluent drain. Opening and/or placing increasing numbers of the effluent flow channels in fluid communication with the filter and effluent flow enables a higher effluent flow/psi thereby reducing the steepness of the gradient. It is important that the outer effluent channels are open and/or in fluid contact with the filter and effluent flow to establish the correct die chamber flow (see the schematic of FIG. 6). Provision of a filtering component and a variable effluent flow path capacity provides a mechanism for effectively filtering the particulate (including even very fine particulates) out of the slurry so that the particulate is retained in the die cavity, while at the same time providing for control and tailoring of the particle gradient in the final preform.

In preferred aspects, the effluent filter member comprises a screen (e.g., with about 50 micron passageways). In certain aspects, it is made from polypropylene, but any suitable material will suffice provided that it is proportion appropriately and displays suitable flow characteristics. Preferably, the filter material or member (e.g., screen) is durable and wear resistant. A variety of particle sizes may be used. In particular aspects, silicon carbide particle sizes of between F200 and F600 grit are used. In preferred aspects, F500 grit particles (mean particle size is 17 microns) are used.

Figure 9:
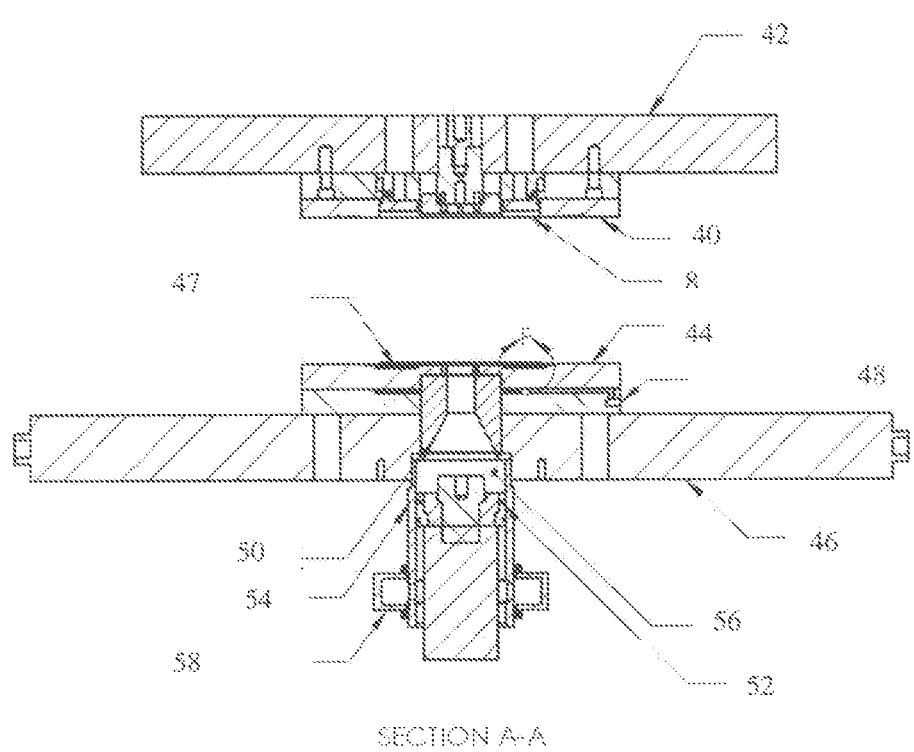
FIG. 9 shows an expanded view of the effluent filtering die of FIG. 7, where the die halves are separated.

FIG. 9 shows an expanded view of the effluent filtering die of FIG. 7, where the die halves are separated.

Figure 10:
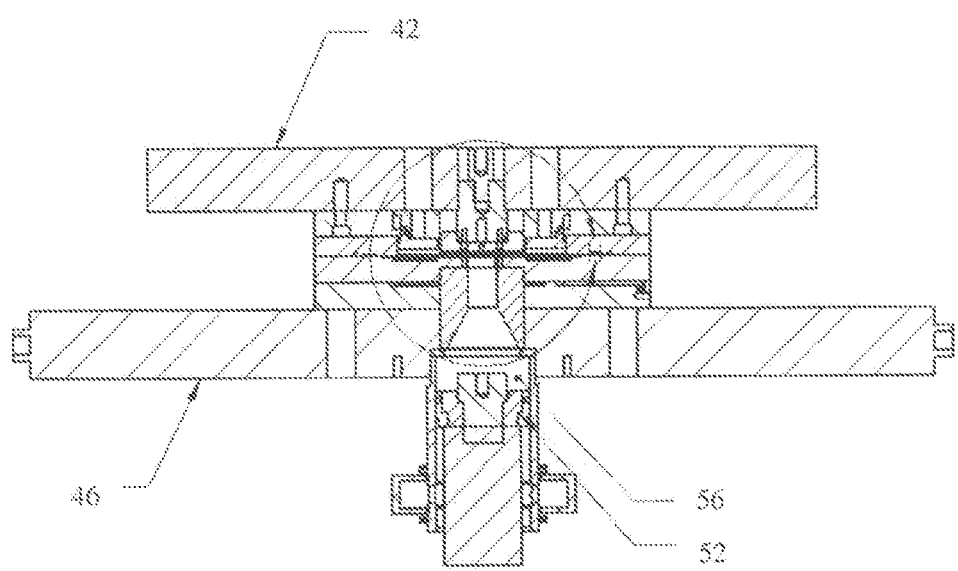
FIG. 10 shows an expanded view of the effluent filtering die of FIG. 7, where the die halves are operatively connected.

FIG. 10 shows an expanded view of the effluent filtering die of FIG. 7, where the die halves are operatively connected.

Figure 11:
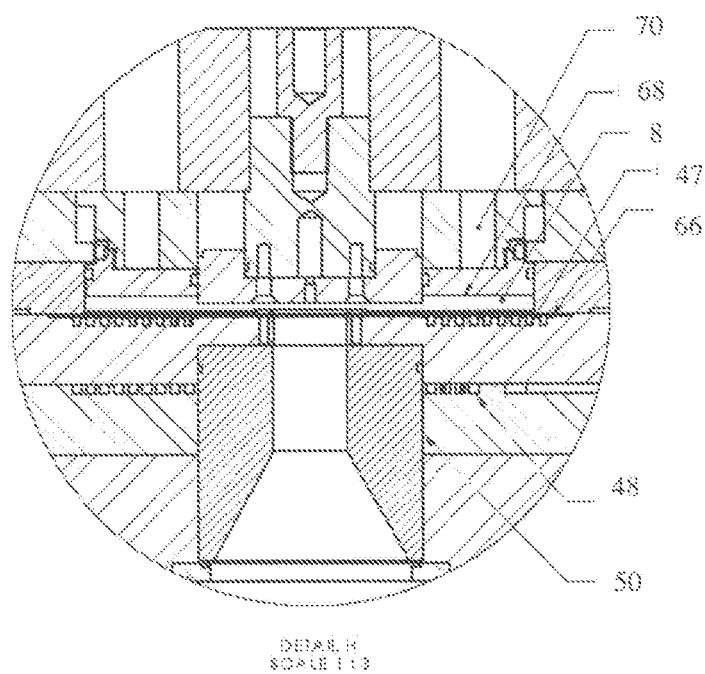
FIG. 11 shows an expanded view (Detail "H") of a section of FIG. 10. Additionally shown is a preform ejector plate 68, and a vibrator mounting hole 70.

FIG. 11 shows an expanded view (Detail "H") of a section of FIG. 10. Additionally shown is a preform ejector plate 68, and a vibrator mounting hole 70.

Figure 12:
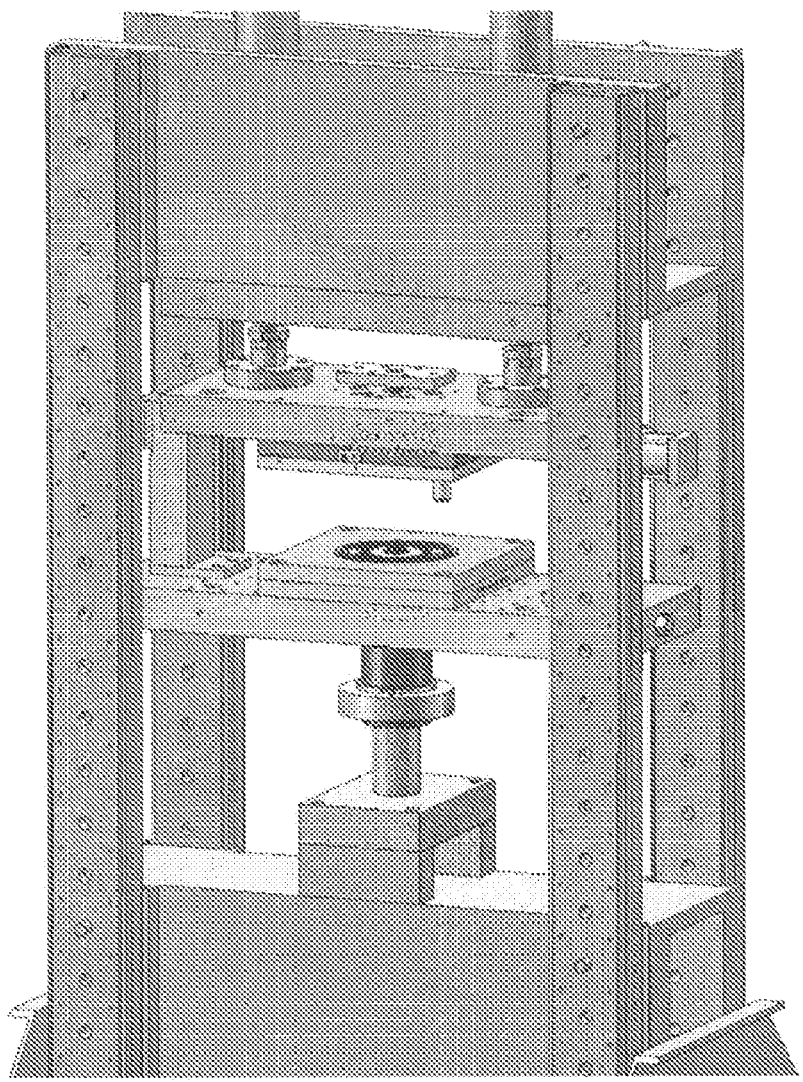
FIG. 12 shows a perspective partial assembly view of an exemplary effluent filtering die set in a press for commercial production.

FIG. 12 shows a perspective partial assembly view of an exemplary effluent filtering die set in a press for commercial production.

Figure 13:
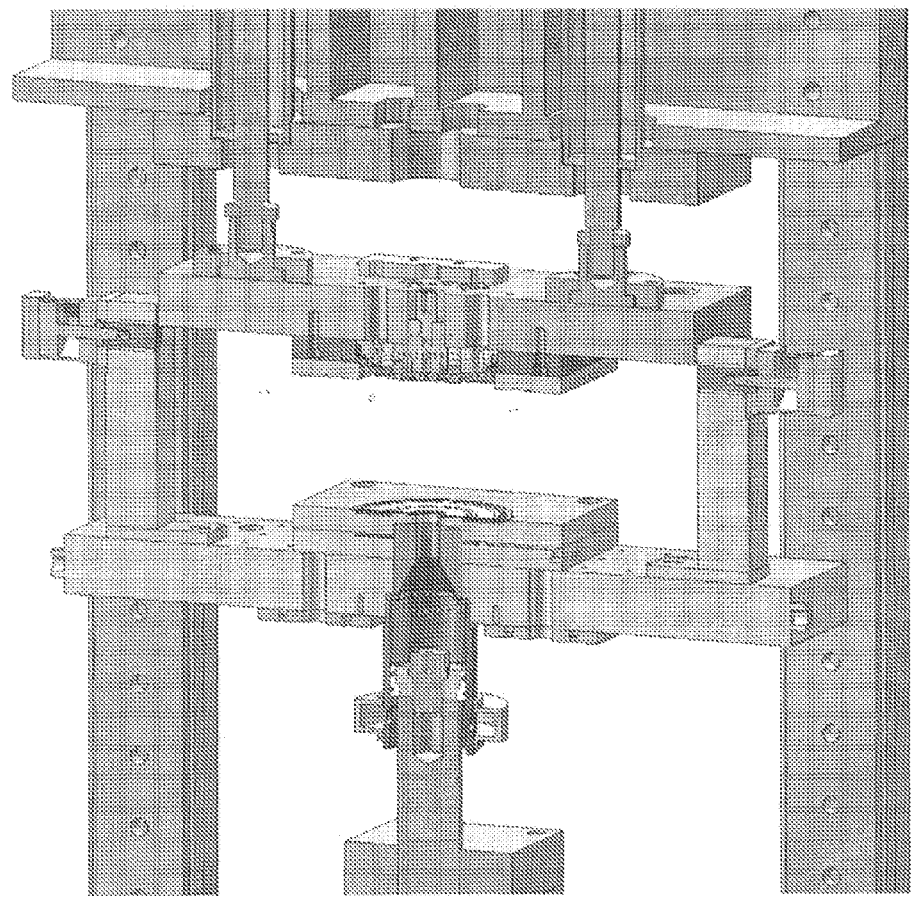
FIG. 13 shows a perspective cross-sectional partial assembly view of the exemplary effluent filtering die set in a press for commercial production show in FIG. 12.

FIG. 13 shows a perspective cross-sectional partial assembly view of the exemplary effluent filtering die set in a press for commercial production show in FIG. 12.

Figure 14:
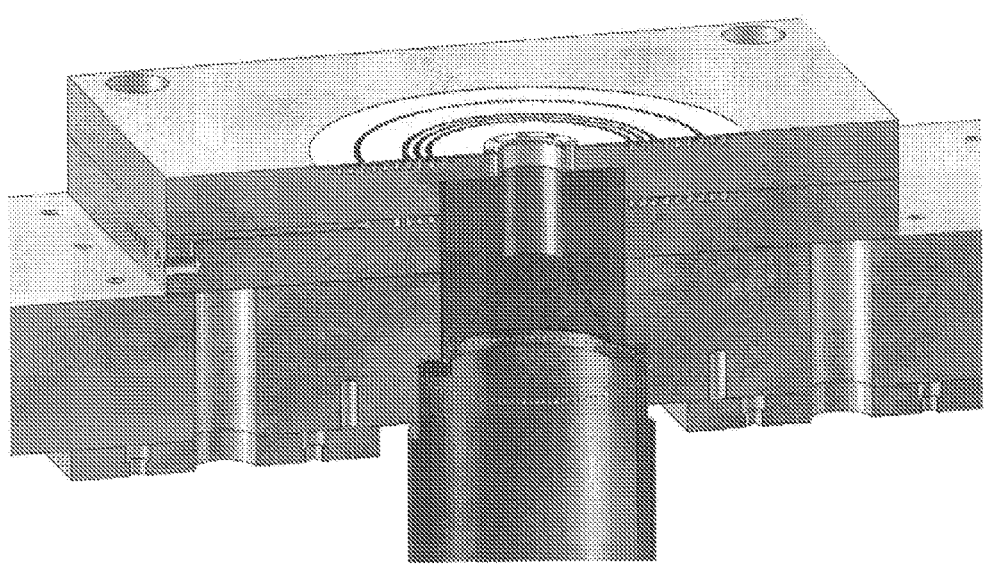
FIG. 14 shows a detailed perspective cross-sectional partial assembly view of the exemplary effluent filtering die set in a press for commercial production show in FIGS. 12 and 13.

FIG. 14 shows a detailed perspective cross-sectional partial assembly view of the exemplary effluent filtering die set in a press for commercial production show in FIGS. 12 and 13.

Preform Press Operation Procedure. In particular exemplary aspects, one or more of the following steps are used for preform press operation:
- Start—Machine in open position—Dies Open, Shot Piston Retracted;
- Open slurry injector door;
- Place 0.75 gallons of slurry in feed tube—Maintain LDT setting to stay between 10-13 inches (on LCD screen at end of shot);
- Activate Cycle Start—Material will be injected into the shot sleeve;
- Clean platen and preform plate free of any excess material;
- In Auto Cycle screen—Press should be in Auto;
- Verify that pressures are set at 1500 psi upper limit and 1200 psi lower limit;
- Verify that timer is set at 7 seconds;
- Verify that no foreign debris/arms/limbs are in the machine clamping area;
- Press Cycle Start;
- Prepare additional plate and material for next shot and batch while injection cycle and hold pressure for set time;
- Cycle complete—Safety gate will raise—Remove plate with preform from Press;
- Cut center excess material out with tool—Place center material in preform recycle container;
- Remove Tray from Drying Oven and place upside down on preform plate—Transfer Preform onto Dryer tray and place in oven; and
- End of cycle.

This die press machine embodiments described herein are able to form the gradient ceramic shape by injecting the slurry through an intricately yet robustly designed injection system that fills the die in a specific manner. The order of operations for the preform forming press are described herein above. In this process the variation in density is enhanced by the die design.

The drying of the preform is a delicate process. Preferably, this process involves a special drying jig to hold the pieces flat and at the correct size during drying, and preferably also designed to be a transfer conveyor to the preform machining area.

Firing of the preforms is preferably accomplished suing a batch kiln. In particular aspects, four batch kilns are contained in a line-up on a preform machining mezzanine. The preforms are placed on kiln furniture as they are fired. After the firing of the preform is complete, the preform is ready to be injected (e.g., infiltration cast; pressure die cast; squeeze cast, etc.) by the a molten matrix material (e.g., molten aluminum). Upon entering the die cast chamber, the preform is heated to 1,093° C. (2,000° F.) via a pass through kiln. This kiln at this point is fed manually to Preferably, a robot picks up the heated preform and automatically places it in a casting die for creation of, for example, an MMC product.

Shot Profiles (Pressure, Velocity, and Displacement). According to particular aspects, 'shot profiles' are important to monitor for ensuring that a consistent or desired part characteristic (e.g., particle gradient profile) is produced. Shot profiles are essential in both the perform casting, and the subsequent preform infiltration casting processes. In the perform press, the shot profile tracks how fast the ceramic slurry is filling the die cavity and at what pressure in order to determine when the particle gradient perform formation is complete (e.g., to the desired gradient, density and water content). Likewise, on a subsequent preform infiltration casting apparatus, the shot profile allows for control over solidification of metal within the casting and helps ensure that performs are infiltrated under the same conditions for each casting to reduce any porosity that might otherwise be caused by early solidification.

Figure 15:
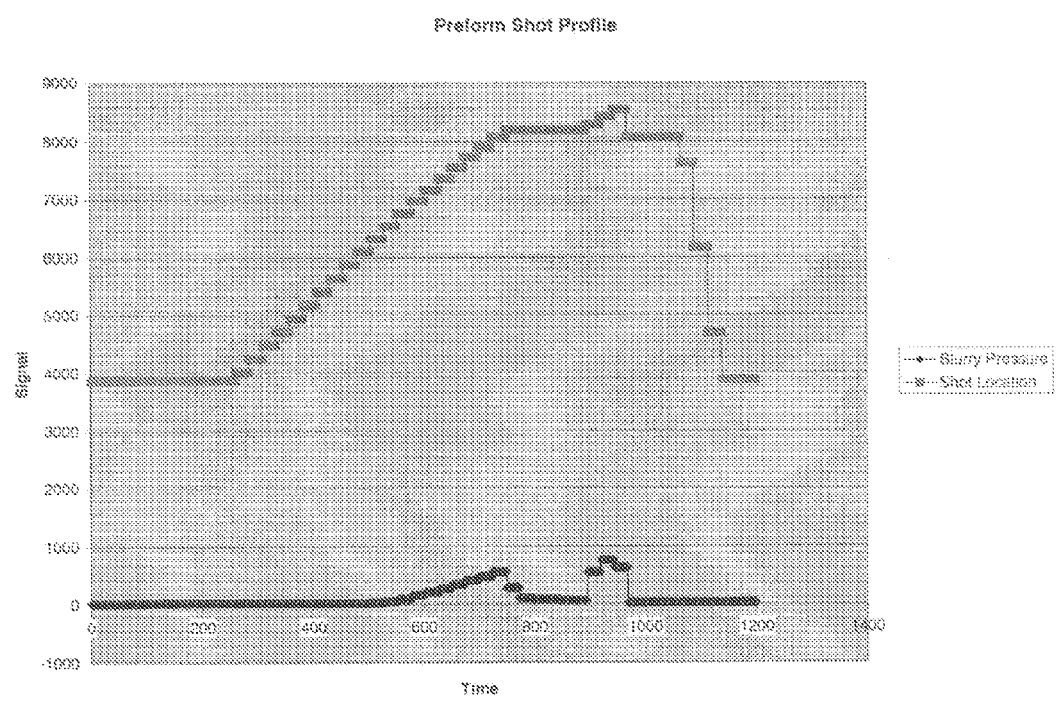
FIG. 15 shows shot profile data from an injection cycle using an embodiment of the inventive preform effluent filtration die press process and apparatus.

FIG. 15 shows shot profile data from an injection cycle using an embodiment of the inventive preform effluent filtration die press process and apparatus. The X-axis shows the time in hundredths of a second (i.e., from 0 to 12 seconds), while the Y-axis shows pressure (psi) (for the bottom slurry pressure curve) and shot piston displacement in thousandths of inches (i.e. from 4 to about 9 inches). Pressure is measured from a gauged positioned in communication with slurry (slurry cavity); in the nozzle portion of the injection apparatus. As shown in the graph, the shot piston is activated and pressure builds in the slurry injection cavity from about 5 to about 7.5 seconds, during which time the pressure increases to about 600 psi, after which time the piston pressure is released to provide a pause, before reassertion of the pressure for a final 'ram' of about 1 second at about 800 psi, which helps clear the device for the next shot cycle. As seen from the upper curve, during the injection cycle the injection piston rod (fitted with a liner transducer to measure travel of the piston rod) is displaced to inject the slurring into the die cavity. In the figure, displacement is tracked in relation to the slurry pressure stating at about 4 inches through about 8 inches, followed by a pause (corresponding to the slurry pressure pause), and then a final displacement to about 8.5 inches (corresponding to the slurry pressure 'ram' used to clear the device for the next shot cycle). Typically, for particular motorcycle preform embodiments, the ratio of slurry volume to cast gradient preform volume in about 3.8:1. The slurry pressure ramp rate and the final slurry pressure at the end of the ramp, are important variables with respect to tailoring preform gradients, and with respect to consistency of manufacturing of a given configuration.

As will be apparent to those of ordinary skill in the art, the slurry pressure ramp rate, the final ramp slurry pressure, the particle size and flocculation characteristics, and the filtering geometry/configuration are variable that can be used to effectively tailor the inventive preforms to encompass a broad range of particle gradient configurations.

Figure 16:
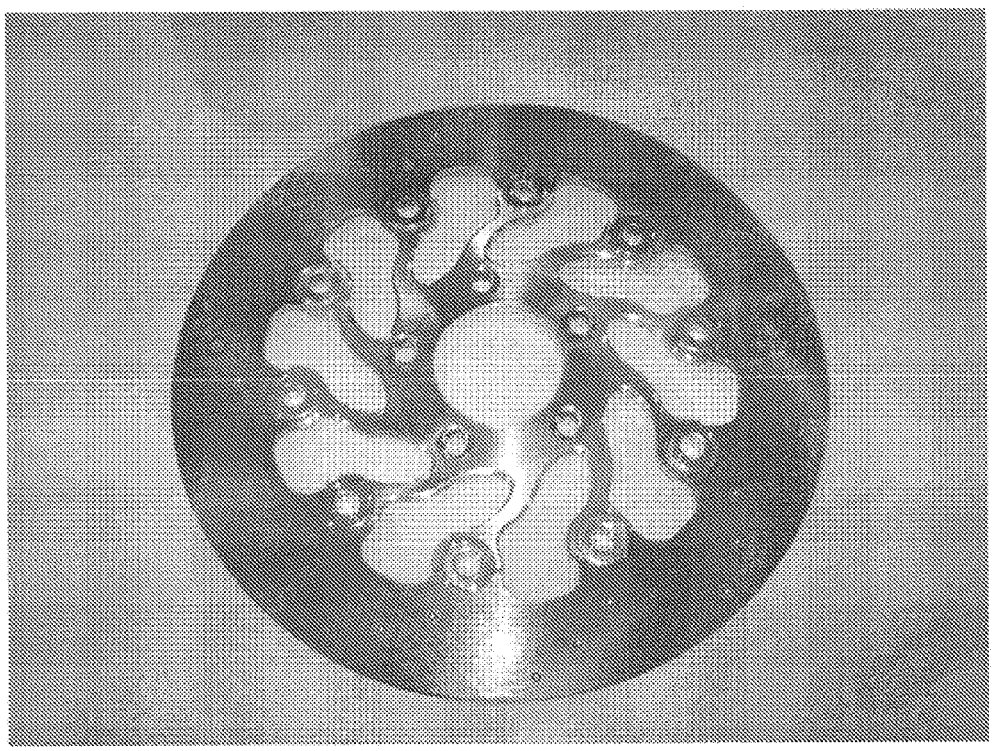
FIG. 16 shows an infiltration cast motorcycle disk brake rotor embodiment comprising a particle gradient preform according to aspects of the present invention. The outer rotor portion is mounted to an internal carrier by means connecting buttons.

FIG. 16 shows an infiltration cast motorcycle disk brake rotor embodiment comprising a particle gradient preform according to aspects of the present invention. The outer rotor portion is mounted to an internal carrier by means connecting buttons.

Figure 17:
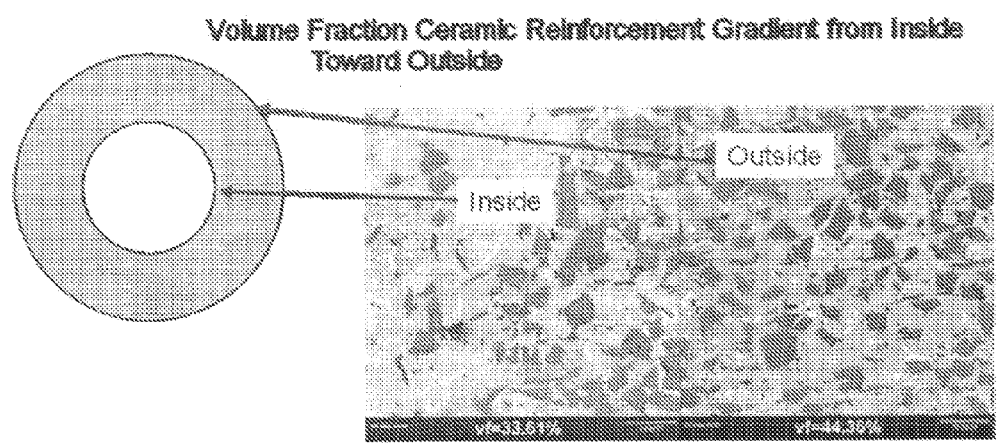
FIG. 17 shows the particle density variation in an infiltration cast disk brake rotor embodiment comprising a particle gradient preform according to aspects of the present invention.

FIG. 17 shows the particle density variation in an infiltration cast disk brake rotor embodiment comprising a particle gradient preform according to aspects of the present invention. Magnified sections from inner and outer (perimeter) portions of the composite rotor are shown to illustrate the particle gradient aspect of the finished infiltration cast preform product. In this particular embodiment, the particle gradient was engineered to provide a linear gradient extending from about 33.6% (particulate volume fraction) to about 44.4% (particular volume fraction).

Figure 18:
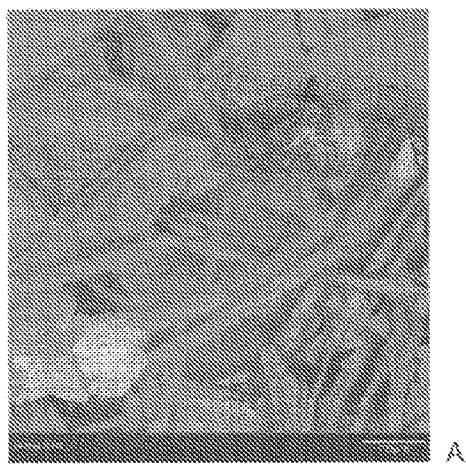
FIGS. 18A, B and C show electron micrographs of the inventive preform material at 700, 1,000 and 2,000 times magnification, respectively.
Figure 18:
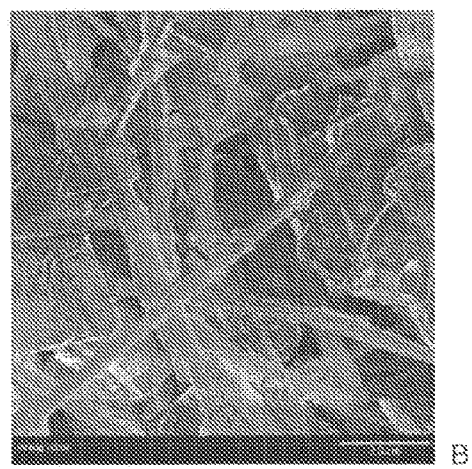
Figure 18:
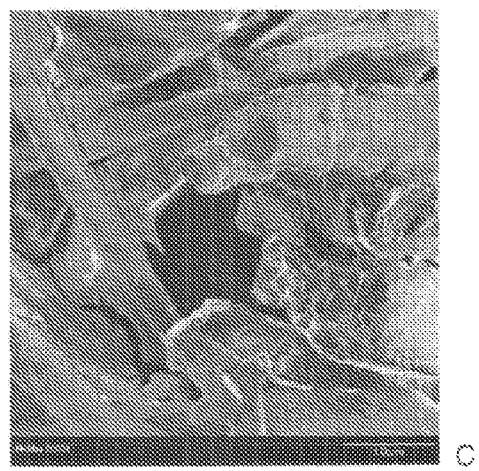

FIGS. 18A, B and C show electron micrographs of the inventive preform material at 700, 1,000 and 2,000 times magnification, respectively.

Example 3

Novel Discontinuous Variable Density Preforms and Brake Drum Particle Gradient Performs Additionally, according to particular aspects of the present invention, the arrangement of the covered filter and the plurality of concentrically configured effluent drain channels provides not only for additional control over the pressure across the die to facilitate production of a particle gradient, but in particular embodiments can be used to position the gradient within a larger preform casting. For example, by using a filter cover plate 60 having internal annular openings from die channel to the filter that communicate with respective internal effluent flow channels, and by closing off effluent flow channels at the perimeter, and opening one or more of the internally located effluent flow channels, the formed particle gradient can be effectively positioned correspondingly closer to the center of the annular preform (see, e.g., FIG. 14, illustrating a variant pattern of operative effluent flow channels). Therefore, opening and/or placing particular effluent flow channels in fluid communication with the filter and effluent flow enables tailoring not only of the gradient shape, but also of the gradient position within the preform. Moreover, discontinuous gradients, comprising two or more gradient portions can be produced by opening and/or placing particular effluent flow channels in fluid communication with the filter and effluent flow. Furthermore, as will be apparent to those of ordinary skill in the art, preforms having reversed gradients can be produced by configuring the apparatus to reverse the shot flow direction across the die cavity. In particular aspects, for example, drum brake preforms are produced by increasing the height of the die chamber (e.g., from about 4 to about 7 inches), while decreasing the radial distance/thickness. In such drum brake preform embodiments, the shot flow direction is reversed (i.e., toward the center for the annual preform) so that an increased particle density is established on the inner margin or surface of the preform, which, in the context of an infiltration cast drum brake rotor comprising the preform, is in contact with the braking friction material to provide for enhanced performance and extended service life of the cast drum brake rotors.

Example 4

Novel Variable Density Preforms were Made by a Novel Preform Pressing Process

This example describes another exemplary method embodiment for making a novel variable density preform, comprising pressing a tapered preform shape into a non-tapered or reduced taper shape in to order to increase the reinforcement particle density proportionate to co-localized with the pressing aspect.

For example a tapered plate is injection molded while subjecting the middle/center of the plate to an impact vibration (e.g., by applying vibration to the annular die by means of impact loading in the center in order to induce a concentric 'ripple wave' to help mobilize the material to the outside), wherein exit vents in the die cavity allow water in the slurry to bleed out radially from the perimeter. Injection and bleeding can be vacuum assisted or not. The taper shaped preform can then be pressed to the right density using suitable temperature and pressures. This method is particularly suitable for casting because multiple die inserts can be optionally used to make preforms, with subsequent placement of the preforms into a die holder on a press to cast. This process allows for production of near net shape of the parts. Drying may be by pumping hot air through the mold, and the dies may be additionally heated. A wave guide may be provided to get RF into the die with the preform in place (i.e., to use the die itself as a microwave cavity).

Example 5

Inventive Variable Density Preforms were Made by a Novel Preform Pressing Process This example describes another exemplary method embodiment for making a novel variable density preform:
Materials:
Preferred solid materials for the slurry include:
Silicon carbide particles/powders (by weight—83% (Range 25-100%));
CERACHEM® ceramic fibers (by weight—17% (Range—0 to 75%));
Colloidal silica—binder (5% by weight (Range 2.5-10%)); and
Cationic starch—binder (5% by weight (Range 2.5-10%)).

In particular aspects, a slurry concentration is determined that meets processing and volume fraction goals. For example, a typical concentration of fiber in the slurry is 1% by weight. Water is added to the forming tank, and any special water treatment may be applied. The desired weight of fibers is added. The desired weight of particles is added (for hybrid particle/fiber preforms). The slurry is mixed at selected mixer speeds to meet proper volume fraction in formed preform. Desired binder or binder(s) are added in the order planned for the particular preform. The prepared slurry is pumped to a forming tank or forming mold depending on the process flow selected. Fiber or fiber/particulate may be deposited on the mold porous surface (or exit orifice of an inventive die chamber) as the water is removed by vacuum and, or pressing to form the wet preform piece. The 'wet' preform is removed from the tool and transferred to a drying tray as desired and placed in a dryer. The dried preform is removed from dryer tray and placed in a kiln for firing if desired. In-process quality checks are optionally but preferably made at each step to insure that proper volume fraction and internal integrity is being achieved. Dried or fired preform blanks are transferred to machining center if that processing route is selected. Machined preforms are transferred to inspection and packing area. Dried or fired net-shaped preforms are transferred directly to the inspection and packing area.

Additional, Optional Materials Include but are not Limited to the Following (in Preferred Weight and Ranges as Given Above):
   Alumina particles/powders;
   Mullite particles/powders
   Boron carbide;
   Boron nitride;
   Ceramic fibers (glass and polycrystalline fibers);
   Calcined alumina-silica particles/powders (45-55 to 80-20 Alumina-silica ratio);
   Any dense, hard, and stable ceramic or metal material;
   Silicon metal particles/powders;
   Colloidal alumina (binder);

Phosphate (binder); and
Combination of binders (e.g., aluminum phosphate).
Material Related Information:
  Volume fraction (% reinforcement material at the material composition selected)
    50-25 preferred outside diameter to inside diameter. Range could be 60-20 to 30-10.
  Particle/powder size
    (−59 to +5u preferred range of particles). Exemplary options are (−75 to +45 u which is F220 grit) to (−25 to +5 u which is F500 grit).
Ceramic fiber option examples:
  KAOWOOL® alumina-silica fibers;
  SUPERWOOL® soluble vitreous fibers (silica-calcium oxide-magnesium oxide);
  SAFFIL® polycrystalline fibers (mullite or high alumina chemistry);
  Alumina fibers;
  Basalt fibers;
  Silica fibers; and
  Glass fibers.
Ceramic Fiber Characteristics:
  Chemistry: Al2O3-35%; SiO2-50%; ZrO2-15% by weight preferred; with exemplary options of 99% Al2O3 by weight to fibers that composed of a mixture on silica, calcia, magnesia, iron oxides, sodium oxide, or boron oxide).
  Shot content; Less than 5% by weight preferred. 0 to 60% exemplary shot content. Shot Size; 100%-44µ preferred. Shot size of 98%-212µ possible.
Key Process Variables:
  First Stage Slurry mix concentrations (% solids in liquid): 10%; range can be 3 to 30%.
  Slurry forming feed concentrations: 40%; range can be 10 to 70%.
  Pressure differential in forming: measured in chamber immediately before injection. Production machine will be many more.
Quality Test Methods:
  Volume fraction distribution; and
  Particle size distribution.
  Preforms are inspected according to standard quality procedures. Approved preforms are transferred to the packing and shipping area, and any "off" specification preforms that can be re-worked are recycled back to the corresponding step in the manufacturing process.

Example 6

Exemplary Disk Brake Rotors were Tested Under U.S. Department of Transportation Testing Standards In particular aspects, an exemplary inventive advanced metal matrix composite (MMC) rotor is currently in commercial production for motorcycle disc brake rotors. This commercial embodiment (11.5 inches in diameter and 5.5 millimeters thick) has been tested in accordance with the United States Department of Transportation (DOT) Federal Motor Vehicle Safety Standard Test 122 (FMVSS 122) by a certified testing lab (Greening Testing Labs; Detroit, Mich.), and has not only passed the dynamometer testing requirements, but has also exceeded the U.S. federal stopping distance and time requirements. To applicants' knowledge, this is the first composite disc brake rotor for motorcycles to have completed federal DOT testing.

Example 7

Exemplary Disk Brake Rotors were Tested on a Test Track Using a Monitored Test Vehicle and were Found to be Substantially Superior to Original Equipment Steel Disk Brake Rotors To enable sales of motorcycle disc brake rotors in Canada, Europe, and Japan, rotors must undergo testing on a test track using a monitored test vehicle. In this regard, the exemplary inventive advanced metal matrix composite (MMC) rotor (11.5 inches in diameter and 5.5 millimeters thick) currently in commercial production was installed on the front axle of a Harley-Davidson® SPORTSTER® to provide a single front disc brake rotor. The test motorcycle was 256 kg (565 pounds) and the rider was about 113 kg (250 pounds).

Without using the rear brake rotor at any time, comparative on-bike testing was conducted at applicants' test track. As a comparative benchmark, the original equipment stainless steel rotor was cycled through multiple 80 mph to 0 stops and within a 15-minute time period, resulting in a warped, grooved and unusable rotor, and wherein the brake caliper became so hot that the seals melted and the brake fluid boiled. By contrast, when the inventive MMC rotor was tested under identical conditions, no warping was detectable. According to particular preferred aspects, the inventive rotor runs generally cooler, cooling (e.g., at 400° C.) approximately 5-times faster than a similarly proportions steel rotor (e.g., at 400° C.). The MMC rotor face surface was not damaged or grooved, and, as expected, had a thin gray transfer film from the friction material. Astonishingly, compared to the stopping distance requirements applicable when using both a front and rear rotor together, the inventive single front MMC rotor stopped in about one-half the distance required.

Therefore, not only are the exemplary inventive advanced metal matrix composite (MMC) disk brake rotors (29.2 cm (11.5 inches) in diameter and 5.5 millimeters thick) substantially lighter than comparable steel rotors, but have demonstrable performance characteristics that substantially surpass the original equipment stainless steel rotor under actual on-bike test track conditions with 365 kg (805 pounds; bike plus rider).

The invention claimed is:

1. A method of making a variable density preform, comprising:
  providing a slurry comprising at least one reinforcement particle component, and at least one liquid component;
  providing a die cavity having at least one inlet opening or orifice and at least one exit opening or orifice defining at least one die cavity flow path therebetween directed toward the exit opening or orifice, the at least one exit opening or orifice suitably sized or configured to provide for exit of the at least one liquid component while impeding or blocking exit of the at least one reinforcement particle component; and
  introducing the slurry under pressure, and for a sufficient time period, through the inlet orifice into the flow path of the die cavity to provide for a decreasing pressure gradient along the flow path direction, wherein during said introducing the at least one liquid component exits through the at least one exit orifice while the at least one reinforcement particle component is impeded or blocked from exiting through the at least one exit orifice, to provide for a variable-density preform having a variable density of the at least one particle component, the particle density increasing in a gradient in the at least one flow path direction.

2. The method of claim 1, wherein the sufficient amount of time and the slurry injection pressure are selected to provide for a linear or substantially linear gradient of a particular slurry.

3. The method of claim 2, comprising measuring the slurry injection pressure at a position at or near the at least one inlet orifice, at a position at or near the at least one exit orifice, or at both ends of the flow path.

4. The method of claim 1, further comprising agitating or vibrating the die during the introduction of the mixture.

5. The method of claim 4, wherein vibrating the die comprises broadband excitation of the die.

6. The method of claim 4, wherein vibrating the die comprises inducing vibrations in the die suitable to provide for at least one of inducing flow of the mixture to extremities of the die cavity, and to increase the apparent viscosity of rheopectic components of the mixture.

7. The method of claim 4, wherein the die cavity comprises at least one centrally-positioned inlet orifice and at least one circumferentially or perimetrically-positioned exit orifice defining at least one radial flow path and direction, and vibrating the die comprises vibrating a die plate or die portion in a manner that imparts broadband concentric vibration emanating from a position at or near the center of the plate or portion, and wherein the variable-density of the preform increases in the at least one radial flow path direction.

8. The method of claim 7, wherein the circumference or perimeter of the die cavity comprises one or more exit openings or orifices that individually or collectively extend continuously or discontinuously around the circumference or perimeter of the die cavity to provide for a concentric radial flow path extending 360 degrees around the at least one centrally positioned inlet orifice, and wherein the variable-density of the preform increases in the radial flow path direction.

9. The method of any one of claims 1 and 4, further comprising, during introduction under pressure of the mixture into the die cavity, application of a vacuum in fluid communication with the die cavity-distal side of the at least one exit orifice.

10. The method of any one of claims 1 and 4, further comprising drying the preform to remove residual amounts of the at least one liquid component.

11. The method of claim 10, wherein drying comprises use of a convection oven and/or infra-red radiation.

12. The method of claim 10, further comprising, prior to drying, lowering the temperature of the preform to a temperature sufficient to induce a phase transition of the at least one liquid component.

13. The method of claim 12, wherein the liquid component comprises water, and the phase transition comprises freezing or formation of ice.

14. The method of claim 12, wherein drying comprises microwave drying.

15. The method of claim 14, wherein microwave drying comprises microwave drying with convection or air circulation.

16. The method of claim 13, wherein microwave drying comprises microwave drying under a vacuum sufficient to reduce the pressure in the microwave chamber to lower than atmospheric pressure.

17. The method of claim 10, further comprising firing or sintering the dried preform by heating it to or at a temperature higher than the drying temperature.

18. The method of claim 17, wherein the slurry additionally comprises at least one fugitive or organic binder component, and firing comprises heating the dried preform to or at a temperature sufficient to effectively remove any residual amounts of the at least one fugitive or organic binder component, to provide for a porous variable-density preform.

19. The method of claim 17, wherein firing comprises heating to or at about 982° C. (1,800° F.) or greater.

20. The method of any one of claims 1 and 4, wherein the Reynold's number of the flowing slurry is less than 2,100.

21. The method of any one of claims 1 and 4, wherein the slurry additionally comprises at least one component selected from the group consisting of a high temperature or inorganic binder, and a fiber component.

22. The method of claim 18, further comprising infiltrating the porous variable-density perform with a molten matrix material to provide for an infiltration casting.

23. The method of claim 22, wherein the molten matrix material is a metal or metal alloy.

24. The method of claim 23, wherein the metal and alloy comprise aluminum.

25. The method of claim 18, wherein the variable-density perform is configured for a brake rotor or brake drum application.

* * * * *